US009250421B2

(12) United States Patent
Misaka

(10) Patent No.: US 9,250,421 B2
(45) Date of Patent: Feb. 2, 2016

(54) ZOOM LENS

(71) Applicant: SAMSUNG ELECTRONICS CO., LTD., Suwon-si, Gyeonggi-do (KR)

(72) Inventor: Makoto Misaka, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 31 days.

(21) Appl. No.: 14/093,674

(22) Filed: Dec. 2, 2013

(65) Prior Publication Data

US 2014/0160342 A1    Jun. 12, 2014

(30) Foreign Application Priority Data

Dec. 7, 2012   (JP) .................................. 2012-268802
Jun. 3, 2013   (KR) ........................ 10-2013-0063697

(51) Int. Cl.
*G02B 15/16* (2006.01)
*G02B 13/00* (2006.01)
*G02B 15/173* (2006.01)
*H04N 5/225* (2006.01)

(52) U.S. Cl.
CPC .............. *G02B 13/009* (2013.01); *G02B 15/16* (2013.01); *G02B 15/173* (2013.01); *H04N 5/225* (2013.01)

(58) Field of Classification Search
CPC ...... G02B 13/009; G02B 15/00; G02B 15/16; G02B 15/20; G02B 15/22
USPC ......................................... 359/676, 686, 687
See application file for complete search history.

(56) References Cited

U.S. PATENT DOCUMENTS

| 5,337,187 | A | 8/1994 | Fukino et al. |
| 5,699,198 | A | 12/1997 | Inadome et al. |
| 5,930,051 | A | 7/1999 | Sato |
| 5,956,184 | A | 9/1999 | Sato |
| 6,101,042 | A | 8/2000 | Sato |
| 7,532,412 | B2 * | 5/2009 | Hatada .......................... 359/688 |

(Continued)

FOREIGN PATENT DOCUMENTS

| JP | 05-142475 A | 6/1993 |
| JP | 06-075167 A | 3/1994 |

(Continued)

OTHER PUBLICATIONS

Extended European Search Report issued for EP 13195169.1 (Jan. 16, 2014).

*Primary Examiner* — Darryl J Collins
(74) *Attorney, Agent, or Firm* — Drinker Biddle & Reath LLP

(57) ABSTRACT

A zoom lens includes, sequentially from an object side, a positive first lens group, a negative second lens group, a positive third lens group, and a positive rear lens group. During zooming from a wide angle position to a telephoto position, an interval between the first lens group and the second lens group increases, and an interval between the second lens group and the third lens group decreases. The rear lens group includes a positive first sub-group, a negative second sub-group, and a positive third sub-group, and focusing is performed by moving the second sub-group toward an image surface side. The zoom lens satisfies the following conditions: $0.2 < frt/ft < 1.8$ and $0.2 < |fb|/frt < 1.0$, where "frt" denotes a focal length of the rear lens group at the telephoto position, "fb" denotes a focal length of the second sub-group, and "ft" denotes a focal length of the zoom lens at the telephoto position.

15 Claims, 22 Drawing Sheets

(56) References Cited

U.S. PATENT DOCUMENTS

| | | | |
|---|---|---|---|
| 8,451,549 | B2 | 5/2013 | Yamanaka et al. |
| 8,542,449 | B2 | 9/2013 | Yamanaka et al. |
| 2003/0123157 | A1* | 7/2003 | Nishimura .................... 359/686 |
| 2010/0302651 | A1 | 12/2010 | Misaka |
| 2011/0122506 | A1* | 5/2011 | Ito ............................... 359/683 |
| 2011/0286106 | A1 | 11/2011 | Yamanaka et al. |
| 2012/0062993 | A1* | 3/2012 | Li ................................ 359/557 |

FOREIGN PATENT DOCUMENTS

| | | |
|---|---|---|
| JP | 10-133109 A | 5/1998 |
| JP | 10-133111 A | 5/1998 |
| JP | 10-133112 A | 5/1998 |
| JP | 11-295597 A | 10/1999 |
| JP | 2001-272601 A | 10/2001 |
| JP | 2011-247962 A | 12/2011 |
| JP | 2011-247963 A | 12/2011 |
| JP | 2011-247964 A | 12/2011 |

* cited by examiner

ZOOM LENS

CROSS-REFERENCE TO RELATED PATENT APPLICATIONS

This application claims the priority benefit of Japanese Patent Application No. 2012-268802, filed on Dec. 7, 2012, in the Japanese Patent Office and Korean Patent Application No. 10-2013-0063697, filed on Jun. 3, 2013, in the Korean Intellectual Property Office, the disclosures of which are incorporated herein in their entirety by reference.

BACKGROUND

1. Field

One or more embodiments of the invention relate to a zoom lens and an electronic device employing the same, and more particularly, to a zoom lens used in, for example, a video camera, a digital camera, a camera-equipped mobile phone, an information portable terminal, or the like.

2. Description of the Related Art

In the related art, a focusing method of zoom lens in the nearest position (i.e., focusing on an object in the nearest position) includes (1) a focusing method using a first lens group and (2) a focusing method using a lens group other than the first lens group.

The zoom lens using the focusing method (1) has a simple structure and a relatively simple design. However, in particular, in the case where the foremost lens group of the zoom lens is a lens group having a positive refractive power and having a wide angle, the focusing method (1) has a problem in that a diameter of a foremost lens of the foremost lens group is increased.

On the other hand, as an example of the focusing method (2), there are methods for resolving the above-mentioned problem. In particular, in the case where the foremost lens group of zoom lens is a lens group having a positive refractive power, and focusing is performed using a second lens group having a negative refractive power, the above-mentioned problem is easily resolved, and thus the focusing method (2) is particularly known as being appropriate for a zoom lens of a high magnification (for example, Japanese Unexamined Patent Publication No. 05-142475, Japanese Unexamined Patent Publication No. 06-75167, etc.).

In addition, as an example of a zoom lens using the focusing method (2), a known zoom lens includes a first lens group having a positive refractive power, a second lens group having a negative refractive power, and a third lens group having a positive refractive power, which are disposed in this order from an object side, and focusing is performed through the third lens group (for example, Japanese Unexamined Patent Publication No. 10-133109, Japanese Unexamined Patent Publication No. 10-133111, Japanese Unexamined Patent Publication No. 10-133112, Japanese Unexamined Patent Publication No. 11-295597, etc.).

Furthermore, as an example of a zoom lens using the focusing method (2), a known zoom lens includes a first lens group having a positive refractive power, a second lens group having a negative refractive power, and a third lens group having a positive refractive power, which are disposed in this order from an object side, and focusing is performed by moving a negative lens included within the third lens group toward an image surface side (for example, Japanese Unexamined Patent Publication No. 2011-247962, Japanese Unexamined Patent Publication No. 2011-247963, and Japanese Unexamined Patent Publication No. 2011-247964).

However, in the above examples, in which a lens group having a positive refractive power precedes a second lens group having a negative refractive power, a focusing method that performs focusing through the second lens group has a problem as follows. In a zoom lens in which a lens group having a positive refractive power precedes a second lens group having a negative refractive power, since the second lens group having the negative refractive power generally affects the magnification within the whole optical system, the second lens group has a large number of lenses and is large in mass. Accordingly, it is difficult to control the second lens group to be minutely moved forward and backward. In particular, the second lens group is not appropriate for autofocusing through the detection of blur of an imaging element.

In addition, a zoom lens—in which a first lens group having a positive refractive power, a second lens group having a negative refractive power, and a third lens group having a positive refractive power are disposed in this order from an object side and focusing is performed through the third lens group—has a large number of lenses, and thus the focusing method has the above-mentioned problem.

Furthermore, a zoom lens—in which a first lens group having a positive refractive power, a second lens group having a negative refractive power, and a third lens group having a positive refractive power are disposed in this order from an object side and focusing is performed by moving a negative lens included within the third lens group toward an image side surface—has only two magnification groups, and thus the focusing method is at a disadvantage in terms of high magnification. To achieve a high magnification ratio, a satisfactory optical performance of the zoom lens may not be maintained, or the optical system may increase in size.

SUMMARY

One or more embodiments of the invention include a zoom lens that is appropriate for, for example, hill-climbing auto focusing through the detection of blur of an imaging element by having a satisfactory optical performance with a high variable zoom and by securing a sufficient point-blank range.

Additional aspects will be set forth in part in the description which follows and, in part, will become apparent from the description, or may be learned by practice of the presented embodiments.

According to one or more embodiments, a zoom lens includes a first lens group having a positive refractive power, a second lens group having a negative refractive power, a third lens group having a positive refractive power, and a rear lens group having a positive refractive power. The first lens group, the second lens group, the third lens group, and the rear lens group are sequentially disposed from an object side. During zooming from a wide angle position to a telephoto position, an interval between the first lens group and the second lens group is increased, and an interval between the second lens group and the third lens group is decreased. The rear lens group includes, sequentially from the object side, a first sub-group having a positive refractive power, a second sub-group having a negative refractive power, and a third sub-group having a positive refractive power, and focusing in the nearest position is performed by moving the second sub-group toward an image surface side. The zoom lens satisfies the following conditions:

$$0.2 < frt/ft < 1.8, \text{ and}$$

$$0.2 < |fb|/frt < 1.0,$$

where "frt" denotes a focal length of the rear lens group at the telephoto position, "fb" denotes a focal length of the second sub-group, and "ft" denotes a focal length of the zoom lens at the telephoto position.

The first sub-group may include at least one aspheric surface in which positive refractive power is decreased toward a peripheral portion thereof, and a cemented lens in which a negative lens and a positive lens are bonded to each other. The zoom lens may satisfy the following condition:

$$0.2 < fa/frt < 0.9,$$

where "fa" denotes a focal length of the first sub-group.

The third sub-group may satisfy the following condition:

$$0.5 < fc/frt < 3.0,$$

where "fc" denotes a focal length of the third sub-group.

During zooming from the wide angle position to the telephoto position, an interval between the rear lens group and a lens group disposed at the object side of the rear lens group may be decreased.

According to one or more embodiments, a zoom lens includes a first lens group having a positive refractive power, a second lens group having a negative refractive power, a third lens group having a positive refractive power, and a rear lens group having a positive refractive power. The first lens group, the second lens group, the third lens group, and the rear lens group are sequentially disposed from an object side. During zooming from a wide angle position to a telephoto position, an interval between the first lens group and the second lens group is increased, an interval between the second lens group and the third lens group is decreased, and an interval between the third lens group and the rear lens group is decreased. The rear lens group includes, sequentially from the object side, a first sub-group having a positive refractive power, a second sub-group having a negative refractive power, and a third sub-group having a positive refractive power, and focusing in the nearest position is performed by moving the second sub-group toward image surface side. The zoom lens satisfies the following conditions:

$$0.2 < frt/ft < 1.8, \text{ and}$$

$$0.2 < |fb|/frt < 1.0,$$

where "frt" denotes a focal length of the rear lens group at the telephoto position, "fb" denotes a focal length of the second sub-group, and "ft" denotes a focal length of the zoom lens at the telephoto position.

The zoom lens may satisfy the following conditions:

$$0.3 < f1/ft < 2.5,$$

$$0.05 < |f2|/ft < 0.5, \text{ and}$$

$$0.1 < f3/ft < 1.0,$$

where "f1", "f2", and "f3" respectively denote focal lengths of the first lens group, the second lens group, and the third lens group.

The first sub-group may include at least one aspheric surface in which positive refractive power is decreased toward a peripheral portion thereof, and a cemented lens in which a negative lens and a positive lens are bonded to each other. The zoom lens satisfies the following condition:

$$0.2 < fa/frt < 0.9,$$

where "fa" denotes a focal length of the first sub-group.

The third sub-group may satisfy the following condition:

$$0.5 < fc/frt < 3.0,$$

where "fc" denotes a focal length of the third sub-group.

According to one or more embodiments, a zoom lens includes a first lens group having a positive refractive power, a second lens group having a negative refractive power, a third lens group having a positive refractive power, a fourth lens group having a negative refractive power, and a rear lens group having a positive refractive power. During zooming from a wide angle position to a telephoto position, an interval between the first lens group and the second lens group is increased, an interval between the second lens group and the third lens group is decreased, an interval between the third lens group and the fourth lens group is increased, and an interval between the fourth lens group and the rear lens group is decreased. The rear lens group includes, sequentially from the object side, a first sub-group having a positive refractive power, a second sub-group having a negative refractive power, and a third sub-group having a positive refractive power, and focusing in the nearest position is performed by moving the second sub-group toward an image surface side. The zoom lens satisfies the following conditions:

$$0.2 < frt/ft < 1.8, \text{ and}$$

$$0.2 < |fb|/frt < 1.0,$$

where "frt" denotes a focal length of the rear lens group at the telephoto position, "fb" denotes a focal length of the second sub-group, and "ft" denotes a focal length of the zoom lens at the telephoto position.

The zoom lens may satisfy the following conditions:

$$0.3 < f1/ft < 2.5,$$

$$0.05 < |f2|/ft < 0.5,$$

$$0.1 < f3/ft < 1.0, \text{ and}$$

$$0.2 < |f4|/ft < 2.5,$$

wherein "f1", "f2", "f3", and "f4" respectively denote focal lengths of the first lens group, the second lens group, the third lens group, and the fourth lens group.

The first sub-group may include at least one aspheric surface in which positive refractive power is decreased toward a peripheral portion thereof, and a cemented lens in which a negative lens and a positive lens are bonded to each other. The zoom lens satisfies the following condition:

$$0.2 < fa/frt < 0.9,$$

where "fa" denotes a focal length of the first sub-group.

The third sub-group may satisfy the following condition:

$$0.5 < fc/frt < 3.0,$$

where "fc" denotes a focal length of the third sub-group.

According to one or more embodiments, an electronic device includes any one of the above-mentioned zoom lenses, and an imaging device that receives an optical image formed by the zoom lens and converts the optical image into an electrical image signal.

According to one or more embodiments, an electronic device includes an interchangeable lens employing any one of the above-mentioned zoom lenses. a main body portion to which the interchangeable lens is detachably installed, and an imaging device that is disposed in the main body portion, receives an optical image formed by the zoom lens, and converts the optical image into an electrical image signal.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
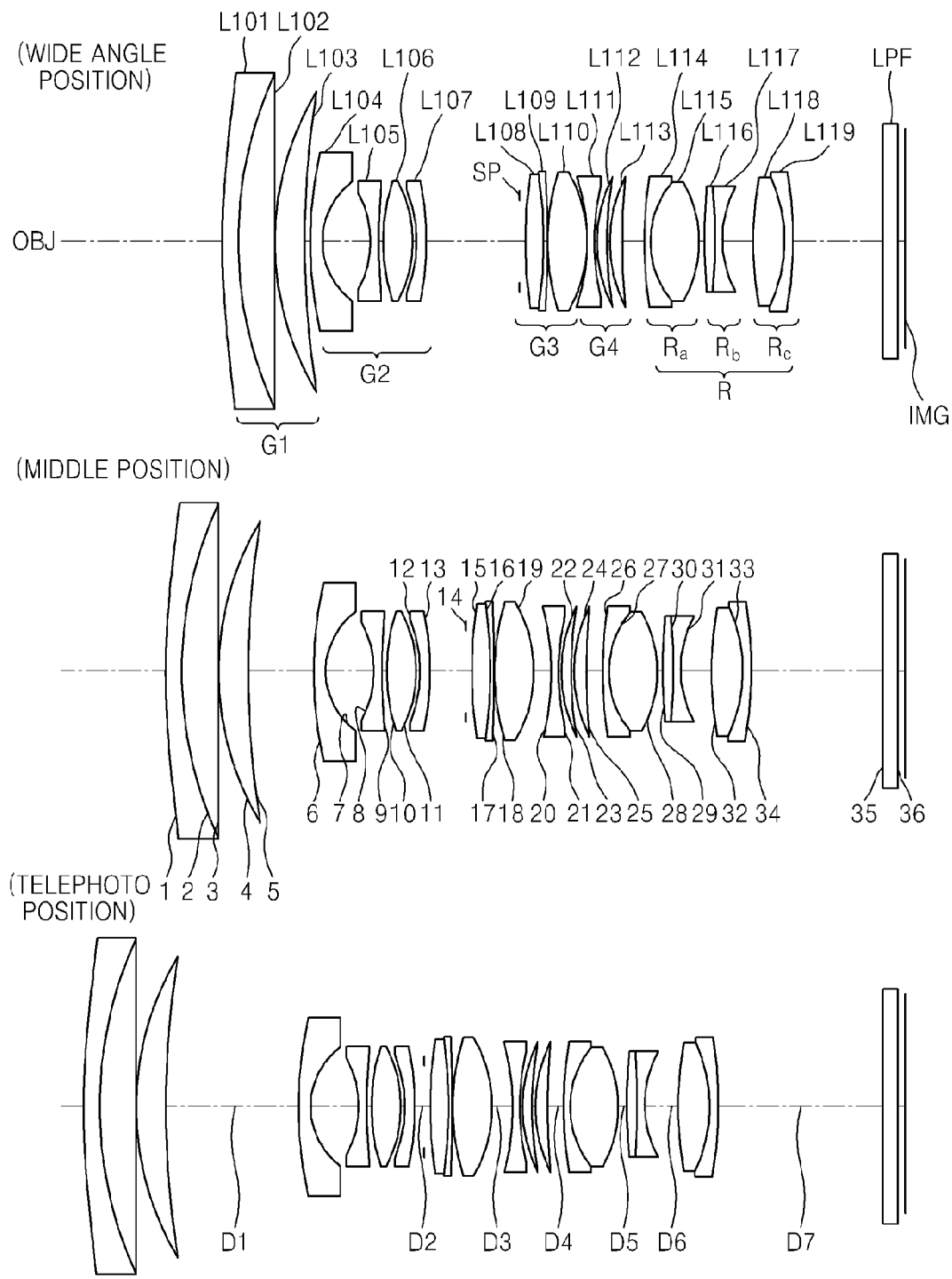
FIG. 1 is a diagram showing an optical arrangement of a zoom lens at a wide angle position, a middle position, and a telephoto position, according to an embodiment of the present disclosure.
Figure 2:
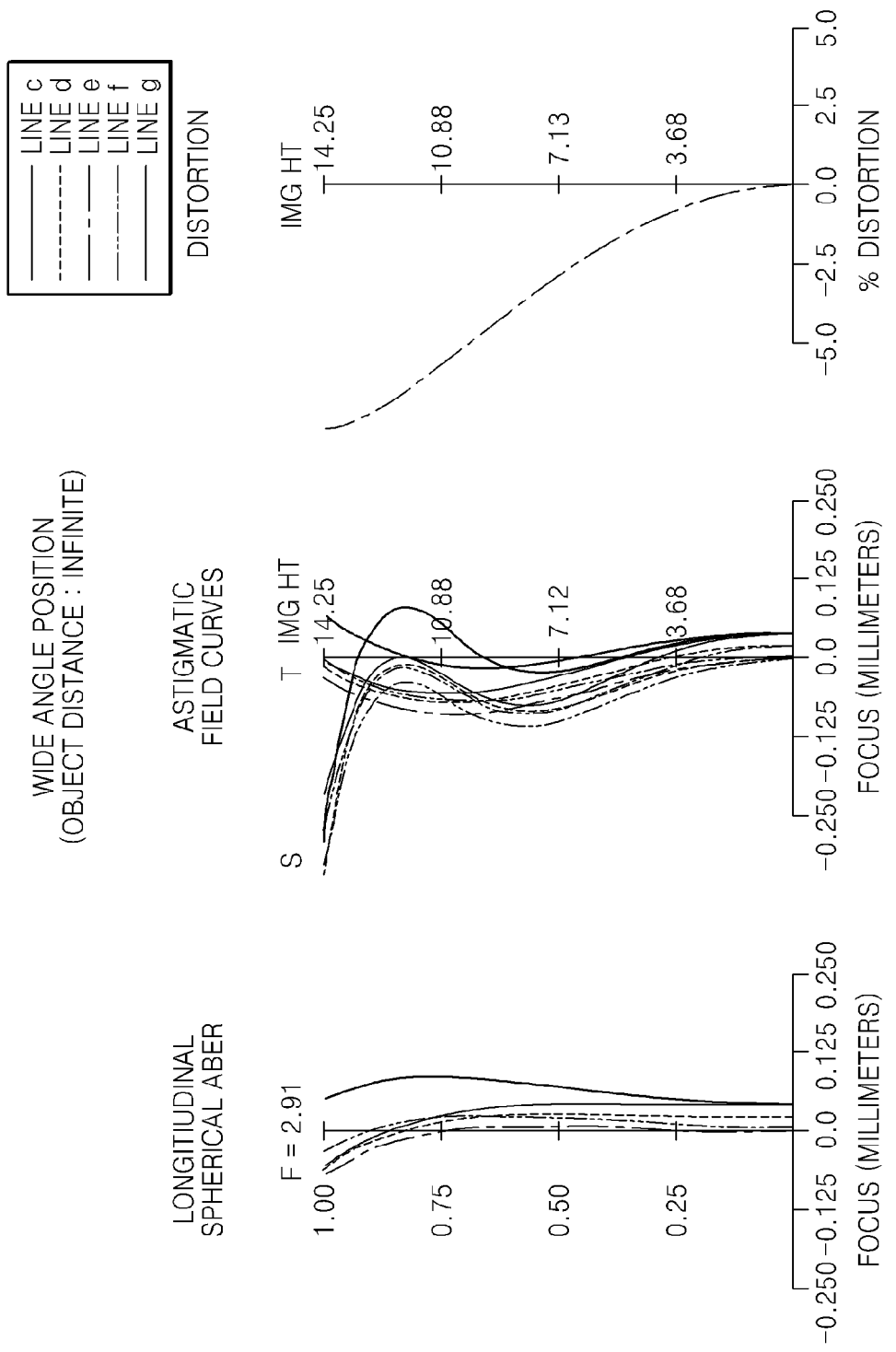
FIG. 2 is an aberration diagram illustrating longitudinal spherical aberration, astigmatism, and distortion of the zoom lens of FIG. 1 at the wide angle position when an object distance is infinite.
Figure 3:
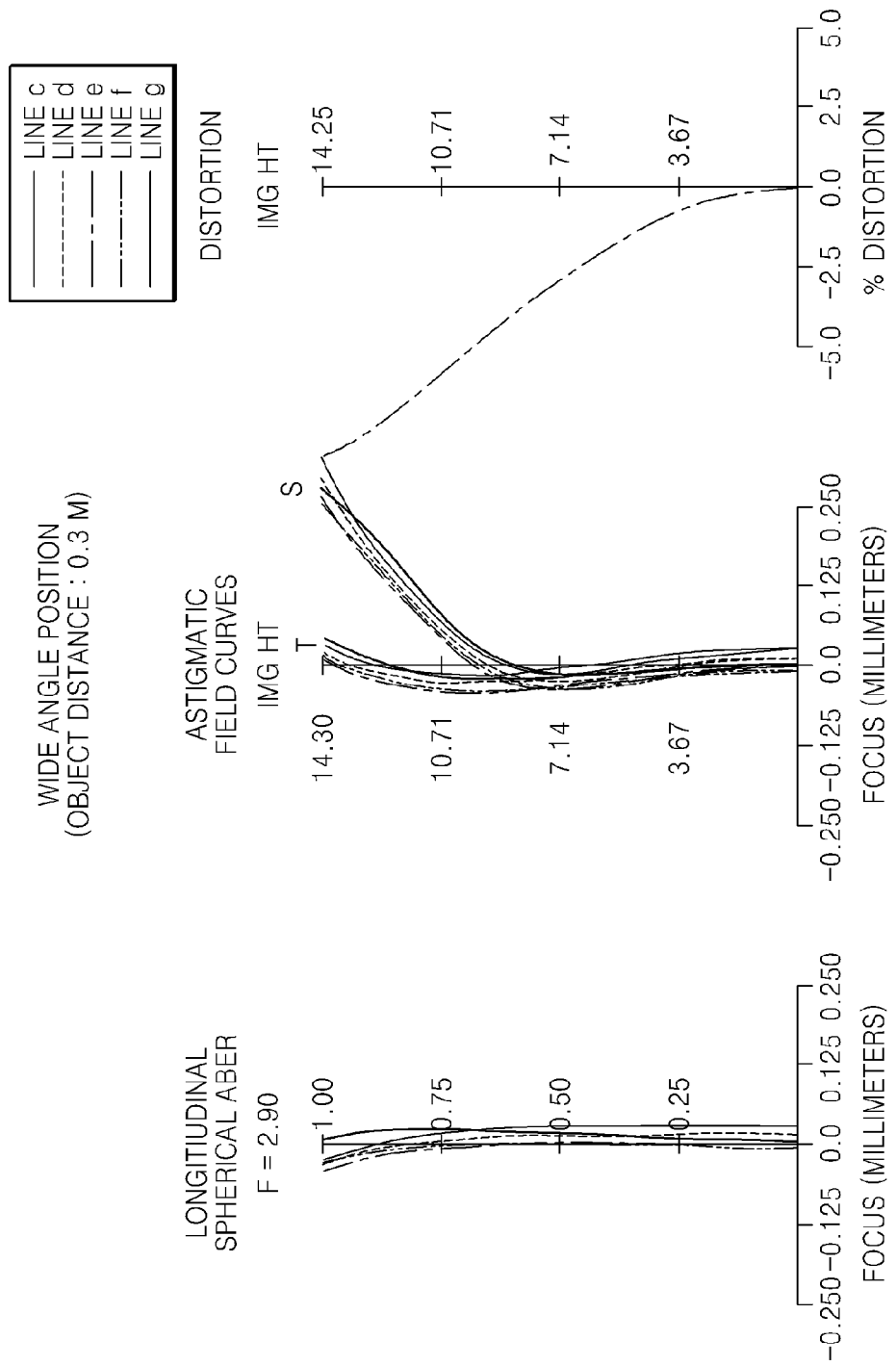
FIG. 3 is an aberration diagram illustrating longitudinal spherical aberration, astigmatism, and distortion of the zoom lens of FIG. 1 at the wide angle position when an object distance is 0.3 m.
Figure 4:
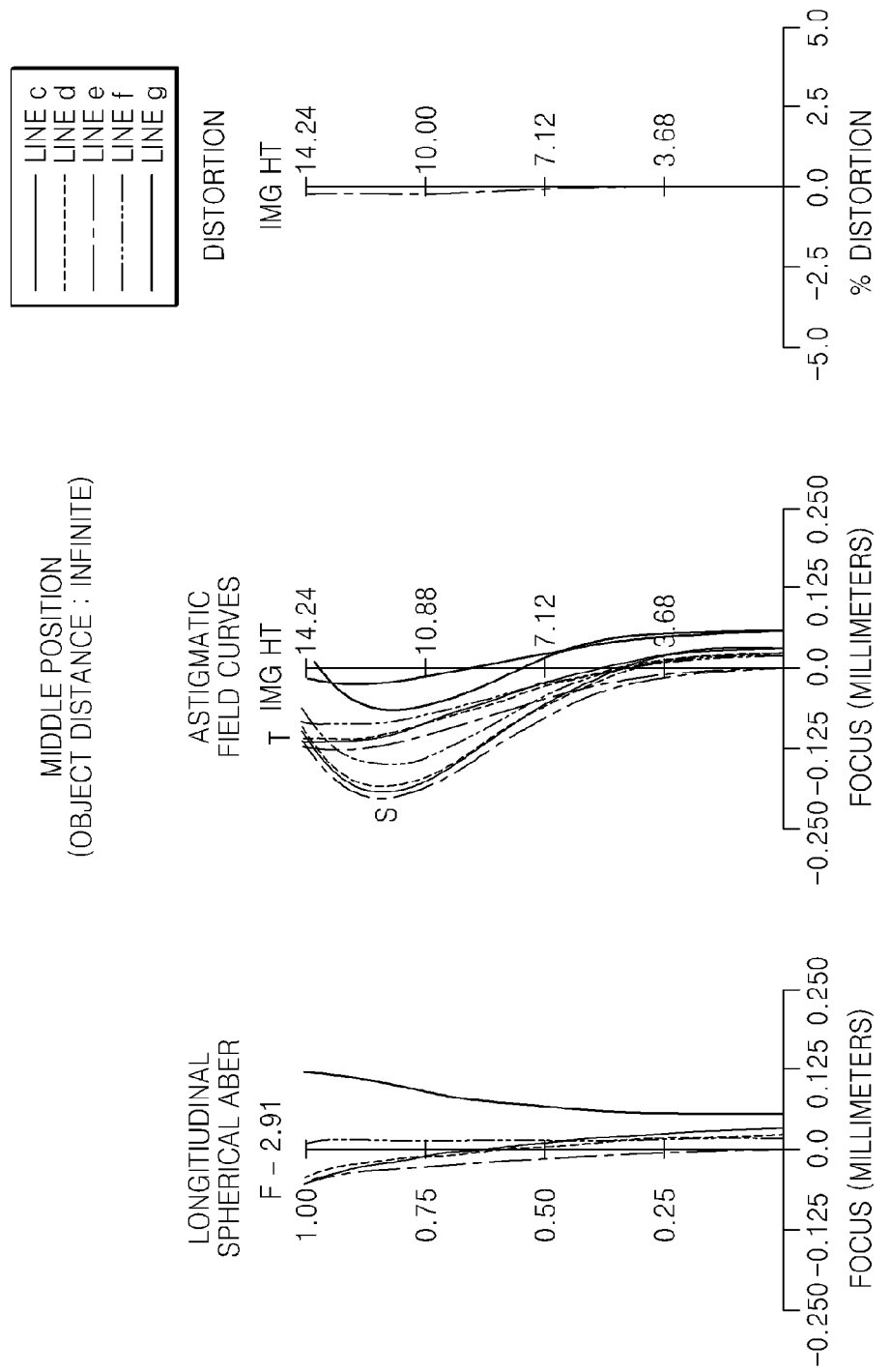
FIG. 4 is an aberration diagram illustrating longitudinal spherical aberration, astigmatism, and distortion of the zoom lens of FIG. 1 at the middle position when an object distance is infinite.
Figure 5:
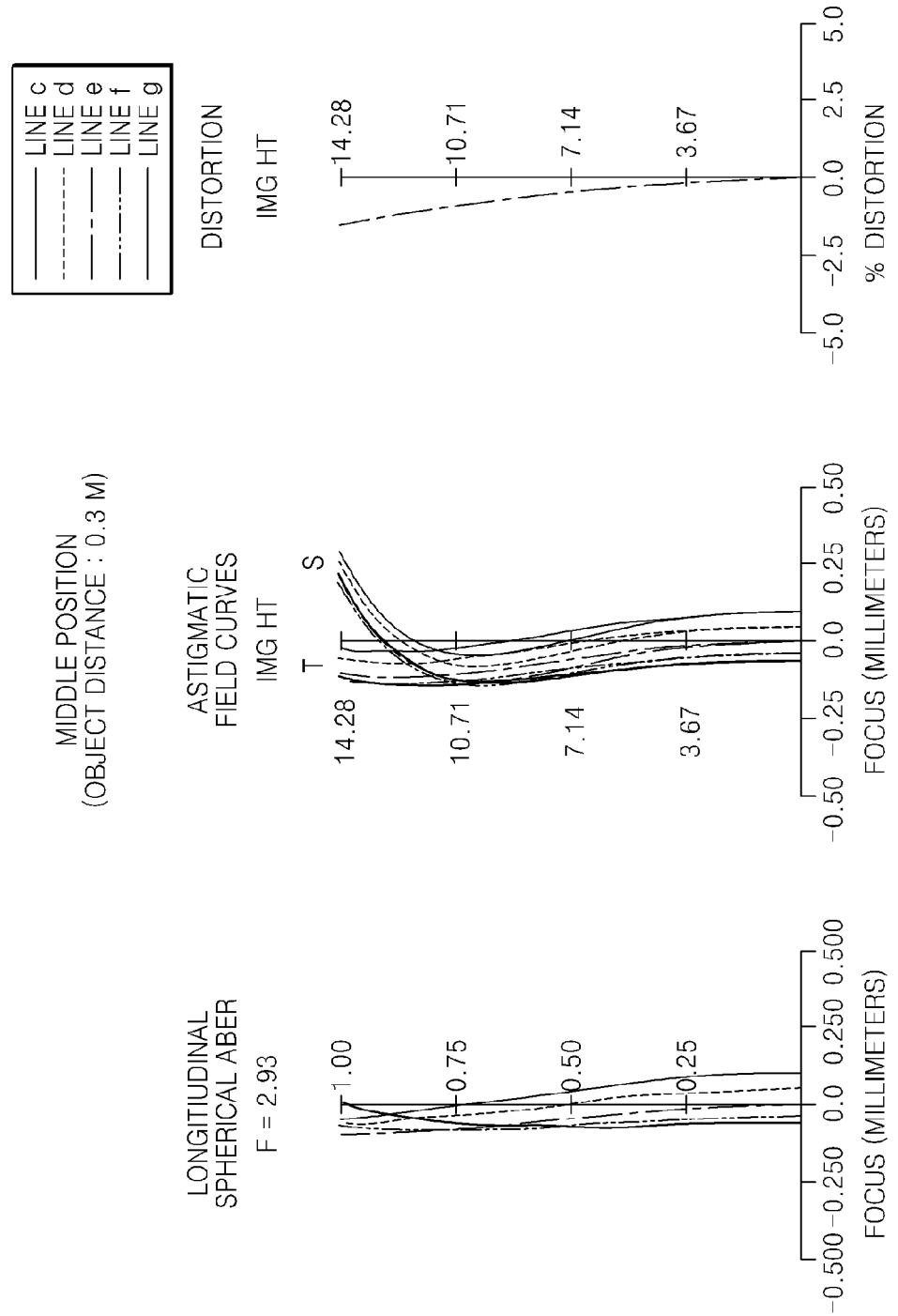
FIG. 5 is an aberration diagram illustrating longitudinal spherical aberration, astigmatism, and distortion of the zoom lens of FIG. 1 at the middle position when an object distance is 0.3 m.
Figure 6:
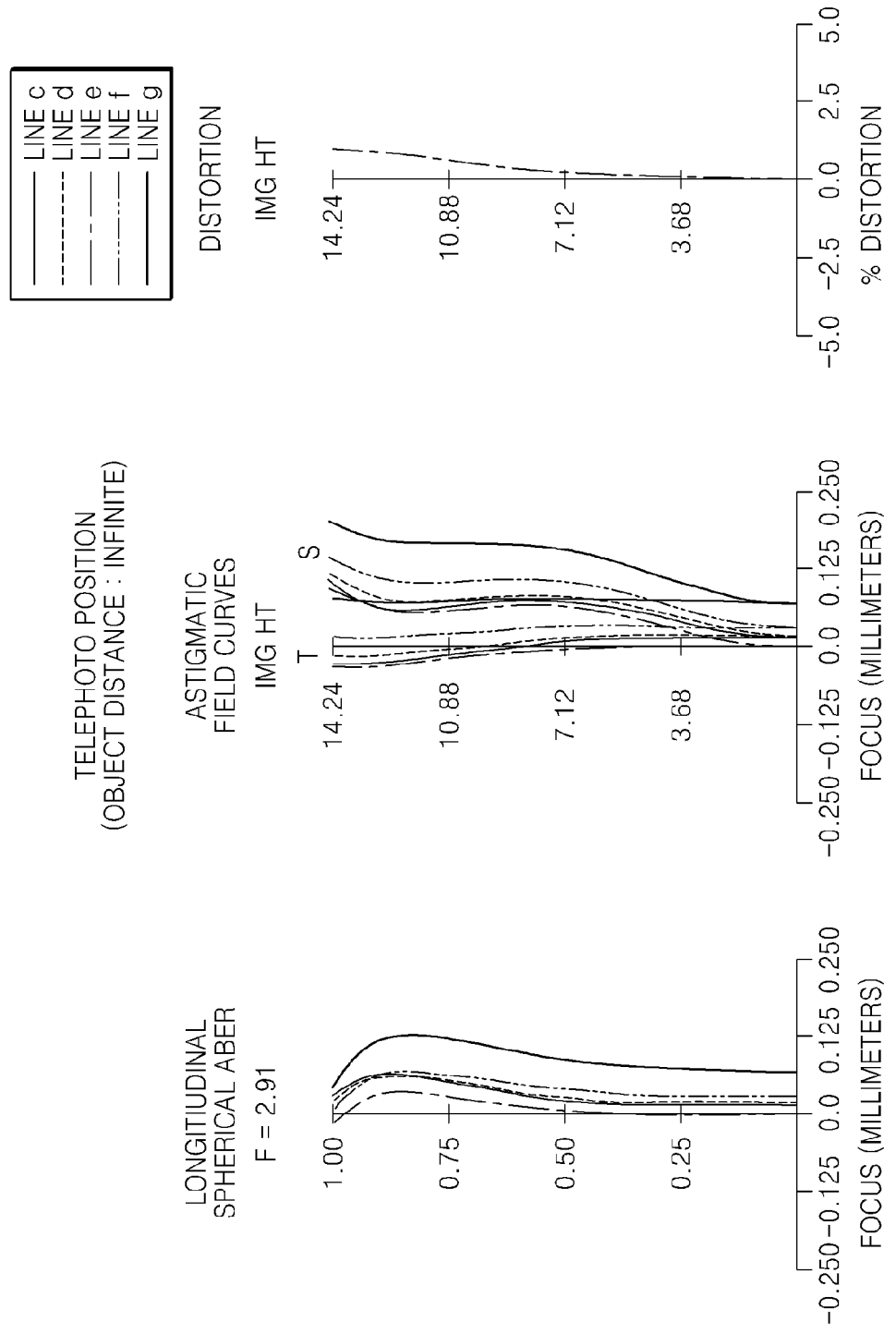
FIG. 6 is an aberration diagram illustrating longitudinal spherical aberration, astigmatism, and distortion of the zoom lens of FIG. 1 at the telephoto position when an object distance is infinite.
Figure 7:
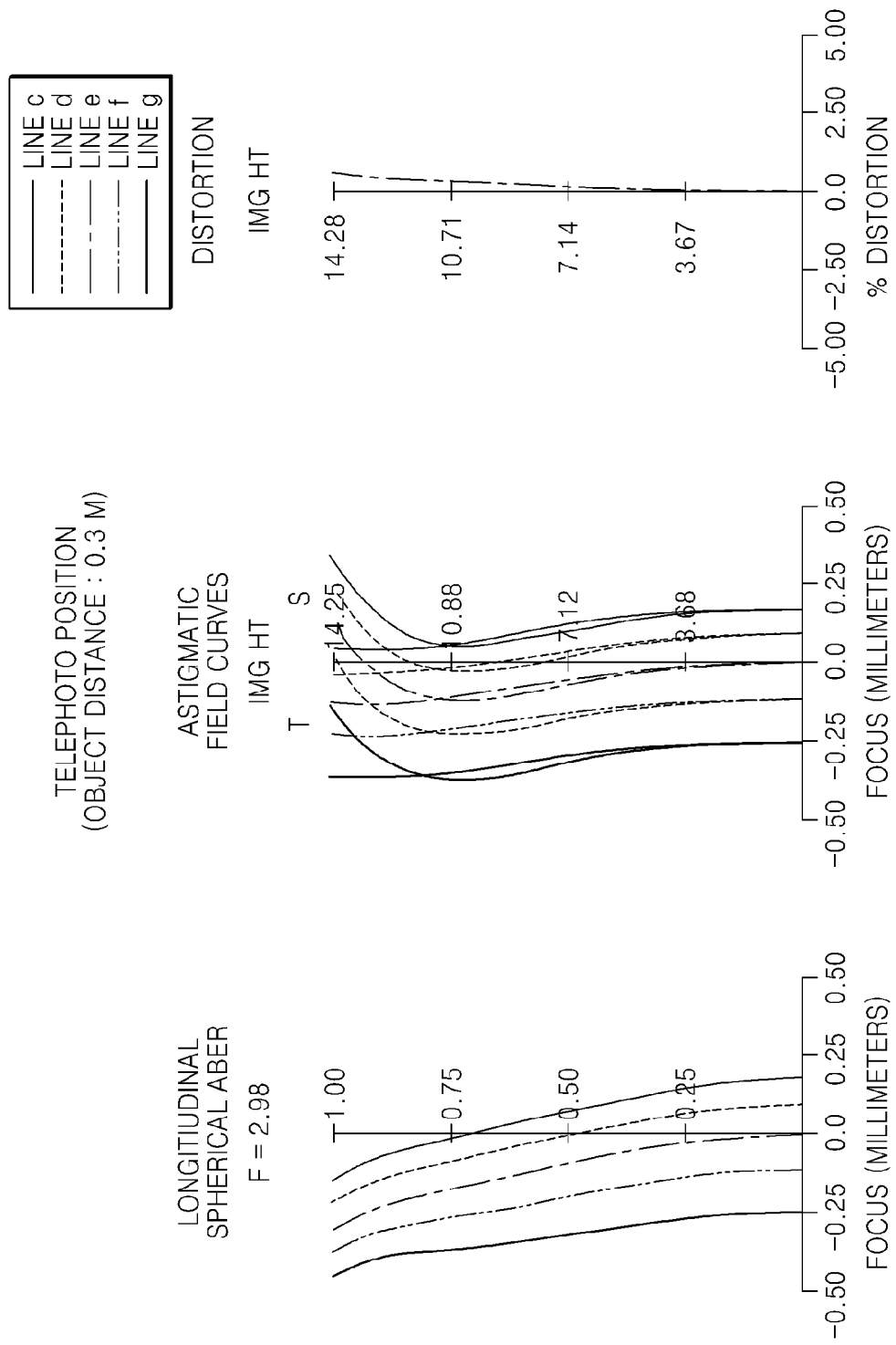
FIG. 7 is an aberration diagram illustrating longitudinal spherical aberration, astigmatism, and distortion of the zoom lens of FIG. 1 at the telephoto position when an object distance is 0.3 m.

Hereinafter, various embodiments of the invention will be described in detail by explaining exemplary embodiments with reference to the attached drawings. The same reference numerals in the drawings denote the same element. In the drawings, the thicknesses of layers and regions are exaggerated for clarity. Expressions such as "at least one of," when preceding a list of elements, modify the entire list of elements and do not modify the individual elements of the list.

Figure 8:
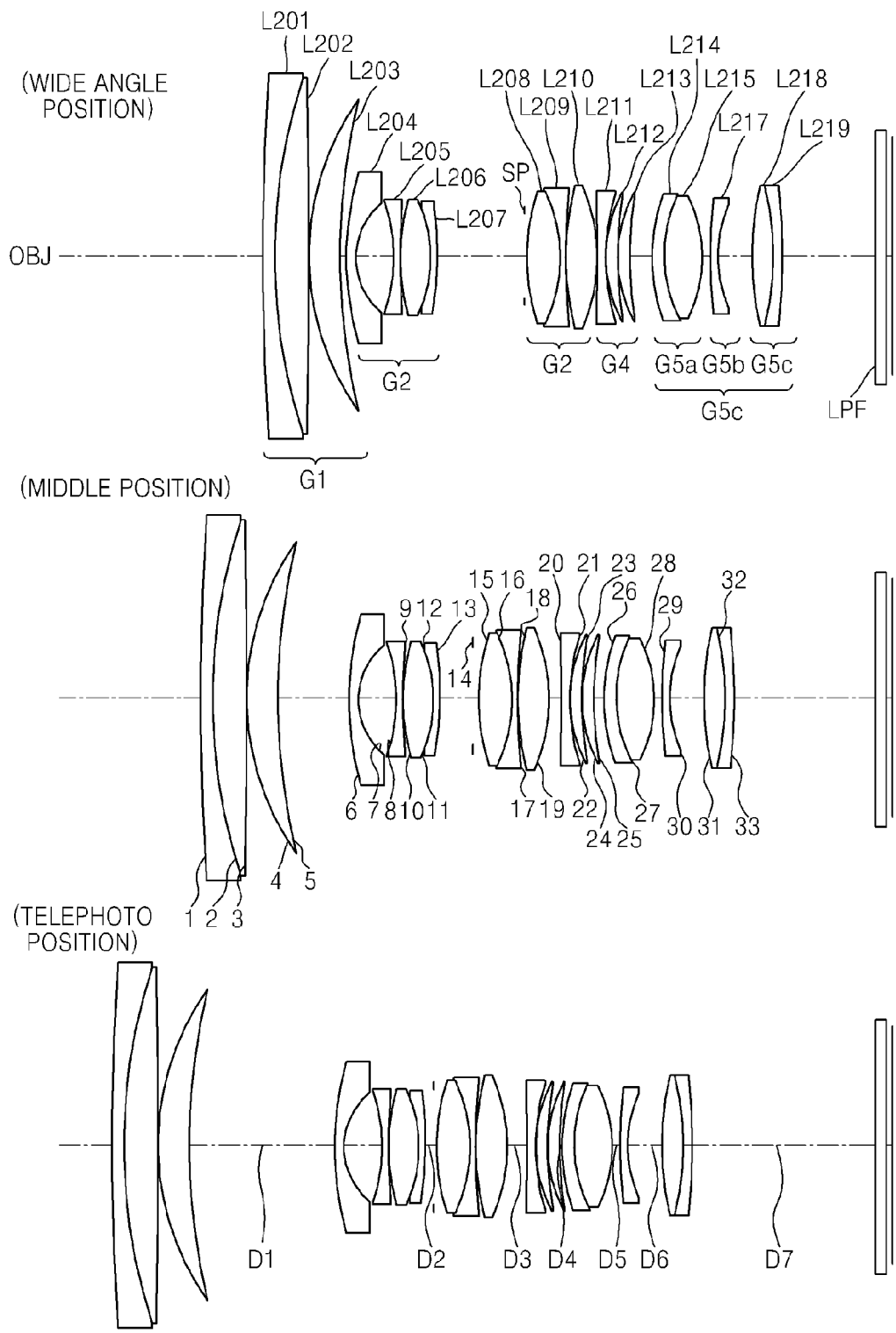
FIG. 8 is a diagram illustrating an optical arrangement of a zoom lens at a wide angle position, a middle position, and a telephoto position, according to another embodiment of the present disclosure.
Figure 9:
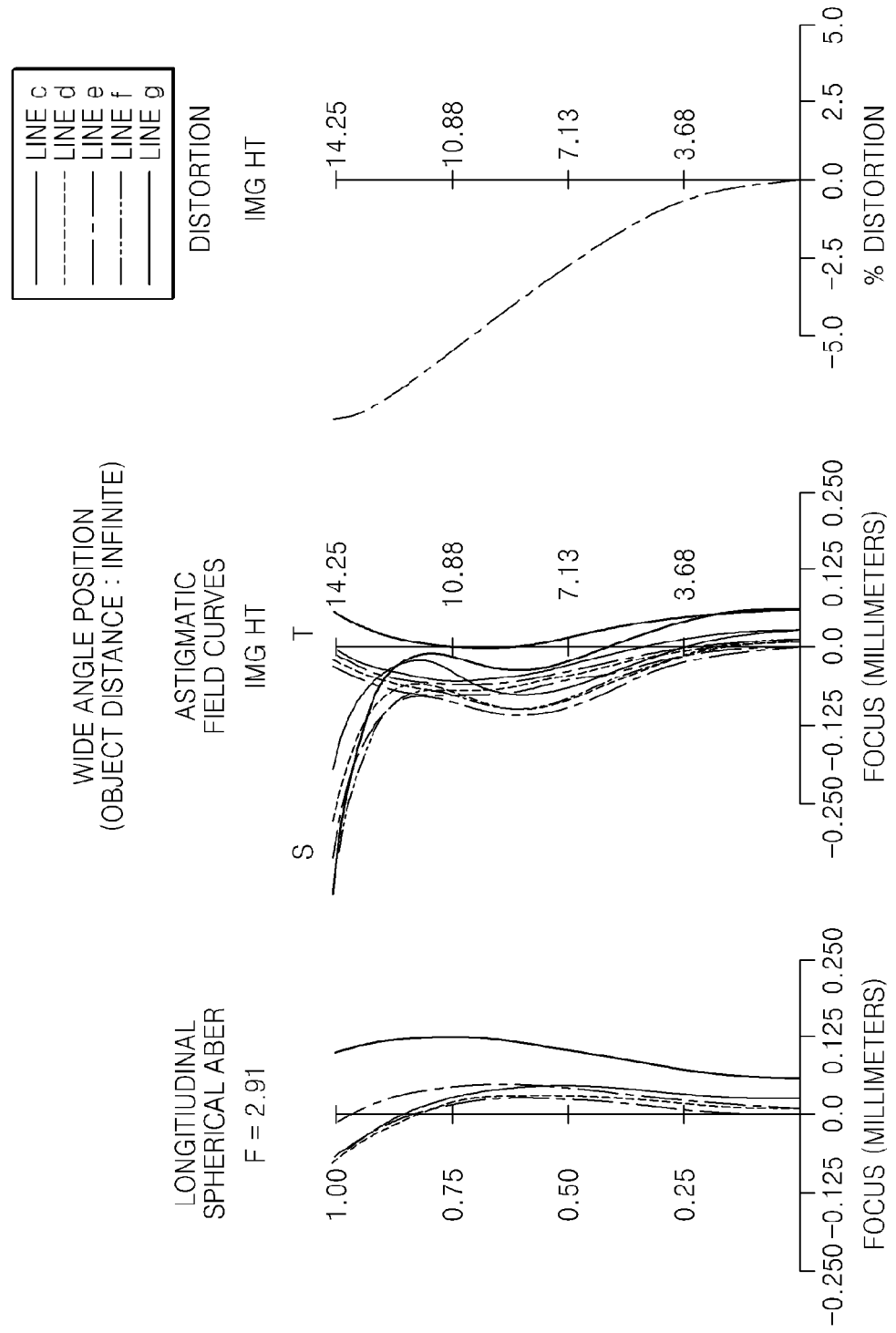
FIG. 9 is an aberration diagram illustrating longitudinal spherical aberration, astigmatism, and distortion of the zoom lens of FIG. 8 at the wide angle position when an object distance is infinite.
Figure 10:
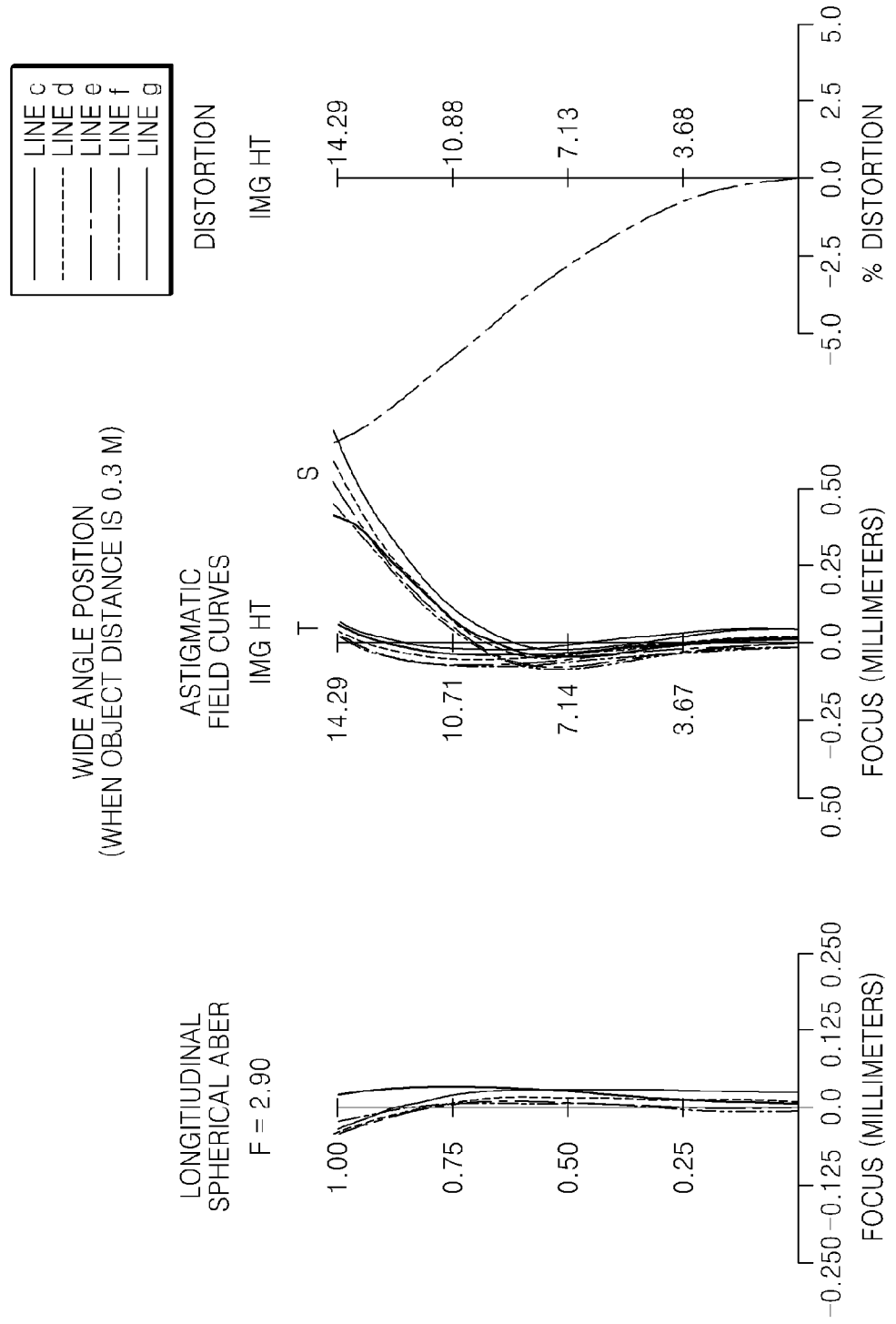
FIG. 10 is an aberration diagram illustrating longitudinal spherical aberration, astigmatism, and distortion of the zoom lens of FIG. 8 at the wide angle position when an object distance is 0.3 m.
Figure 11:
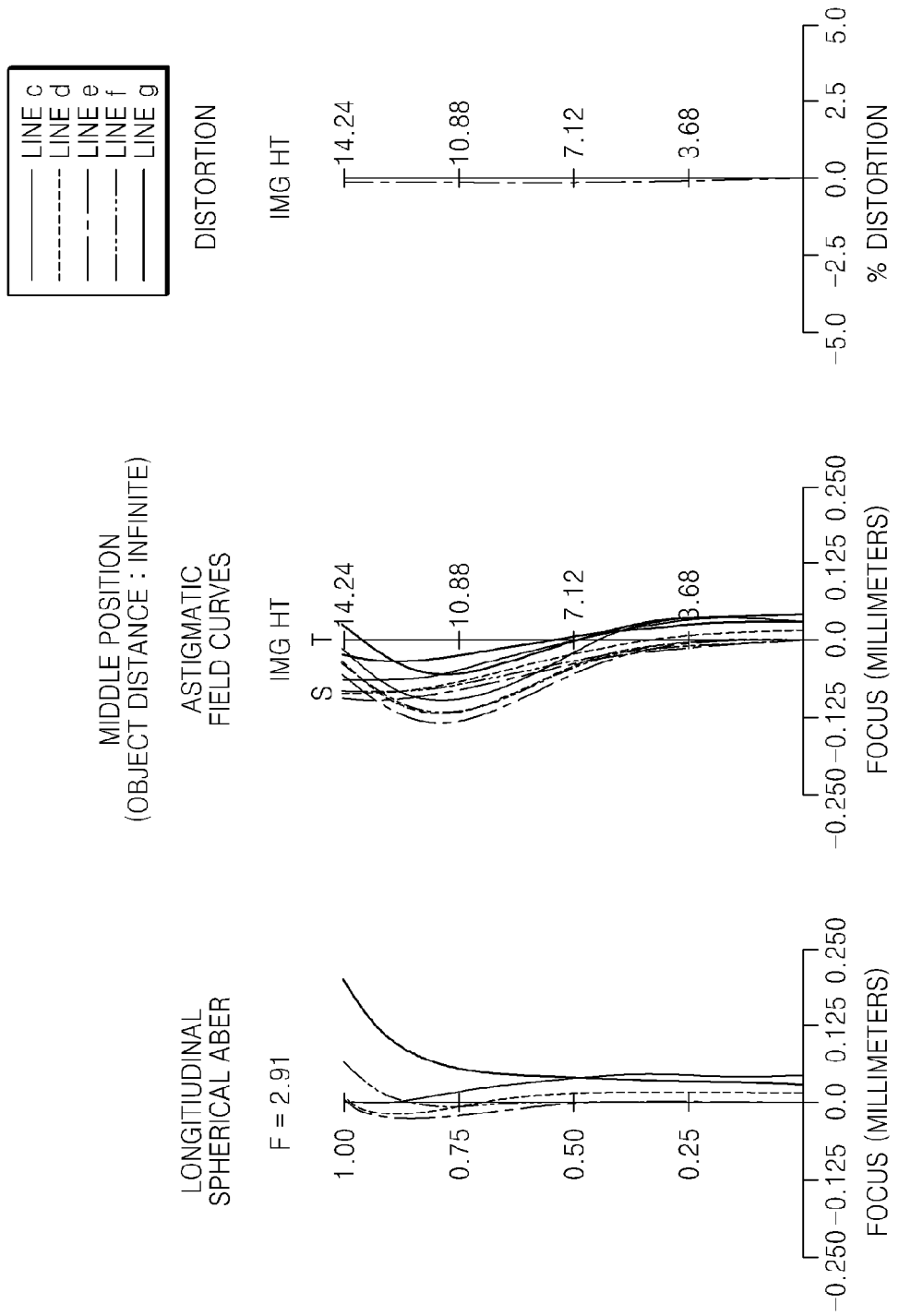
FIG. 11 is an aberration diagram illustrating longitudinal spherical aberration, astigmatism, and distortion of the zoom lens of FIG. 8 at the middle position when an object distance is infinite.
Figure 12:
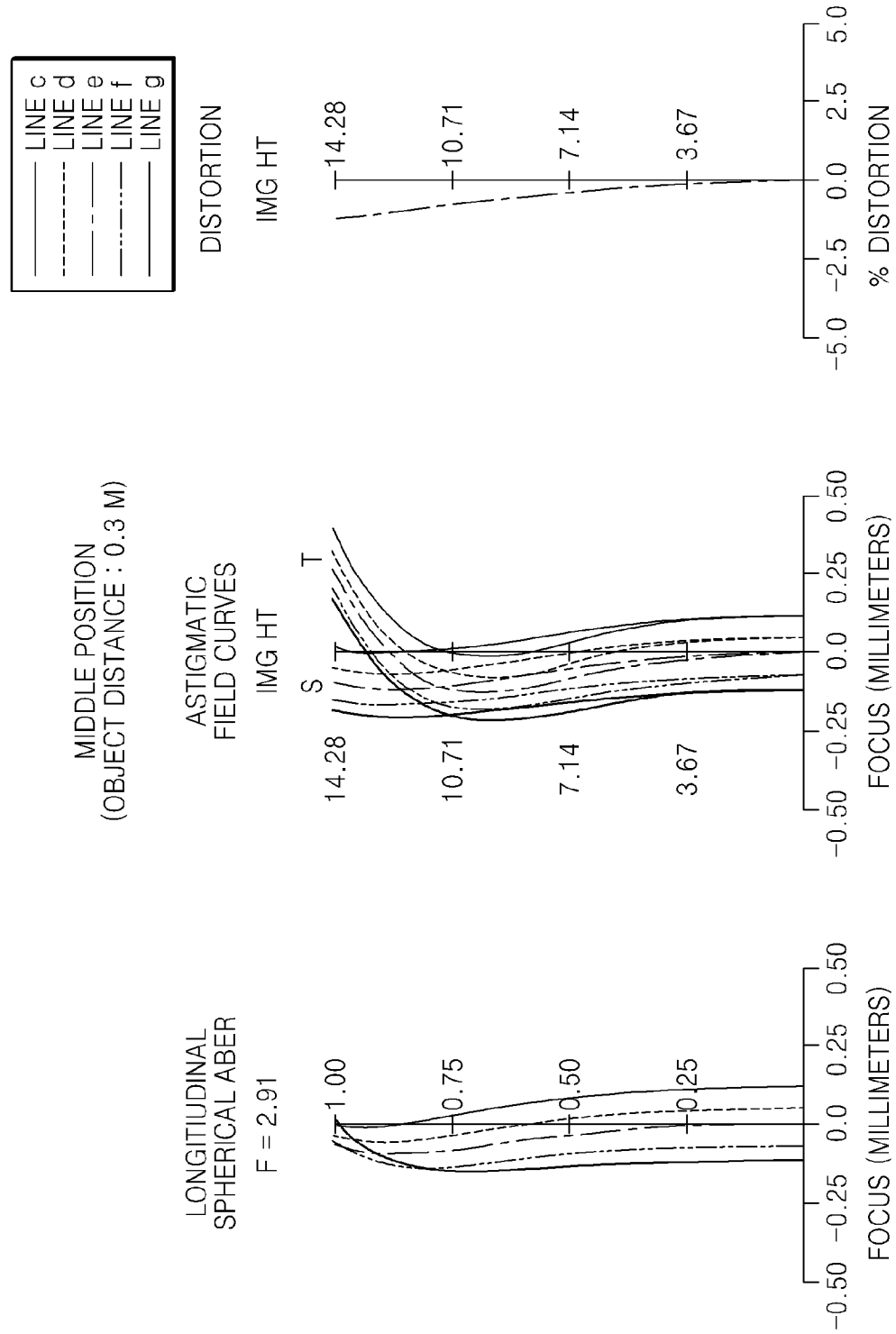
FIG. 12 is an aberration diagram illustrating longitudinal spherical aberration, astigmatism, and distortion of the zoom lens of FIG. 8 at the middle position when an object distance is 0.3 m.
Figure 13:
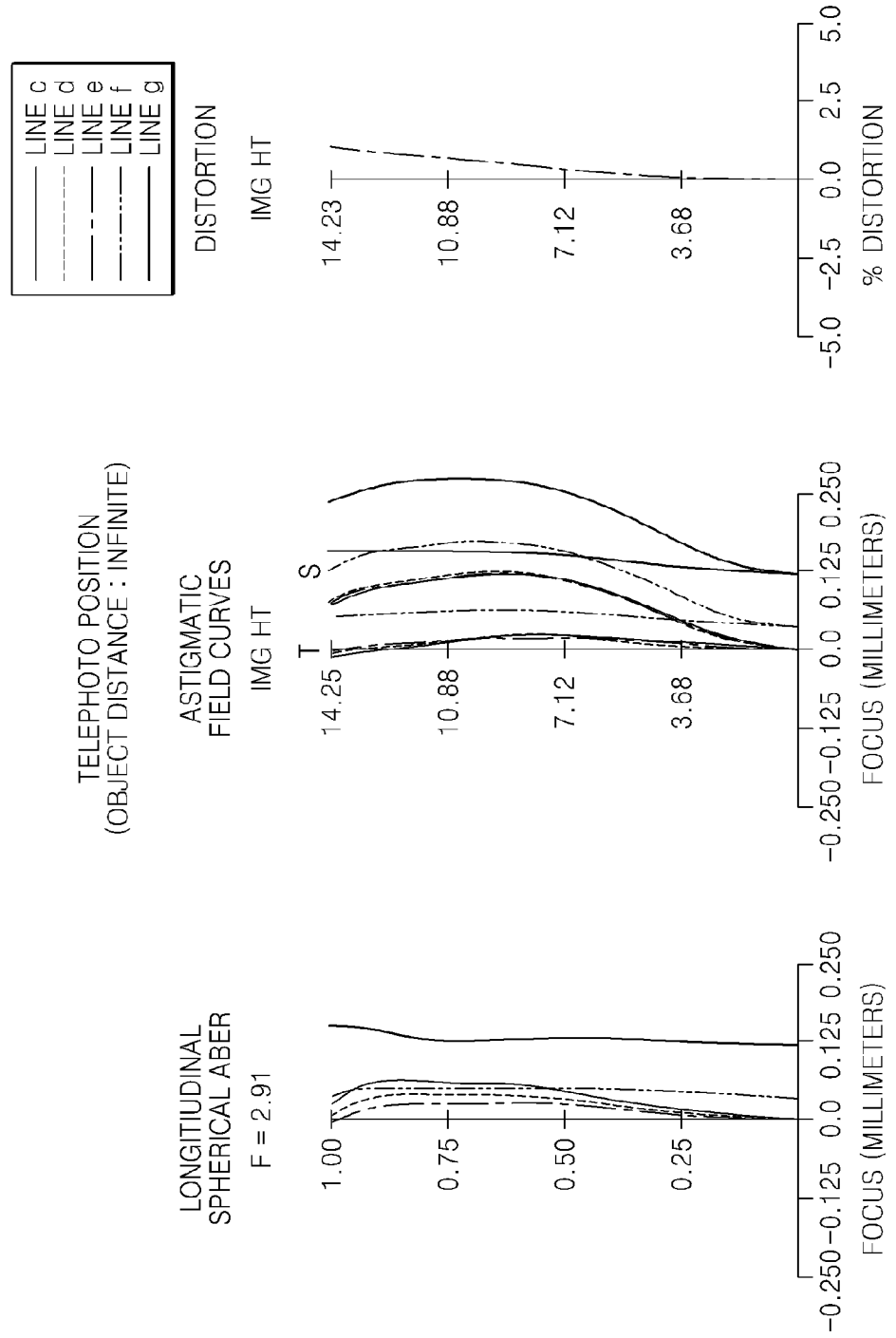
FIG. 13 is an aberration diagram illustrating longitudinal spherical aberration, astigmatism, and distortion of the zoom lens of FIG. 8 at the telephoto position when an object distance is infinite.
Figure 14:
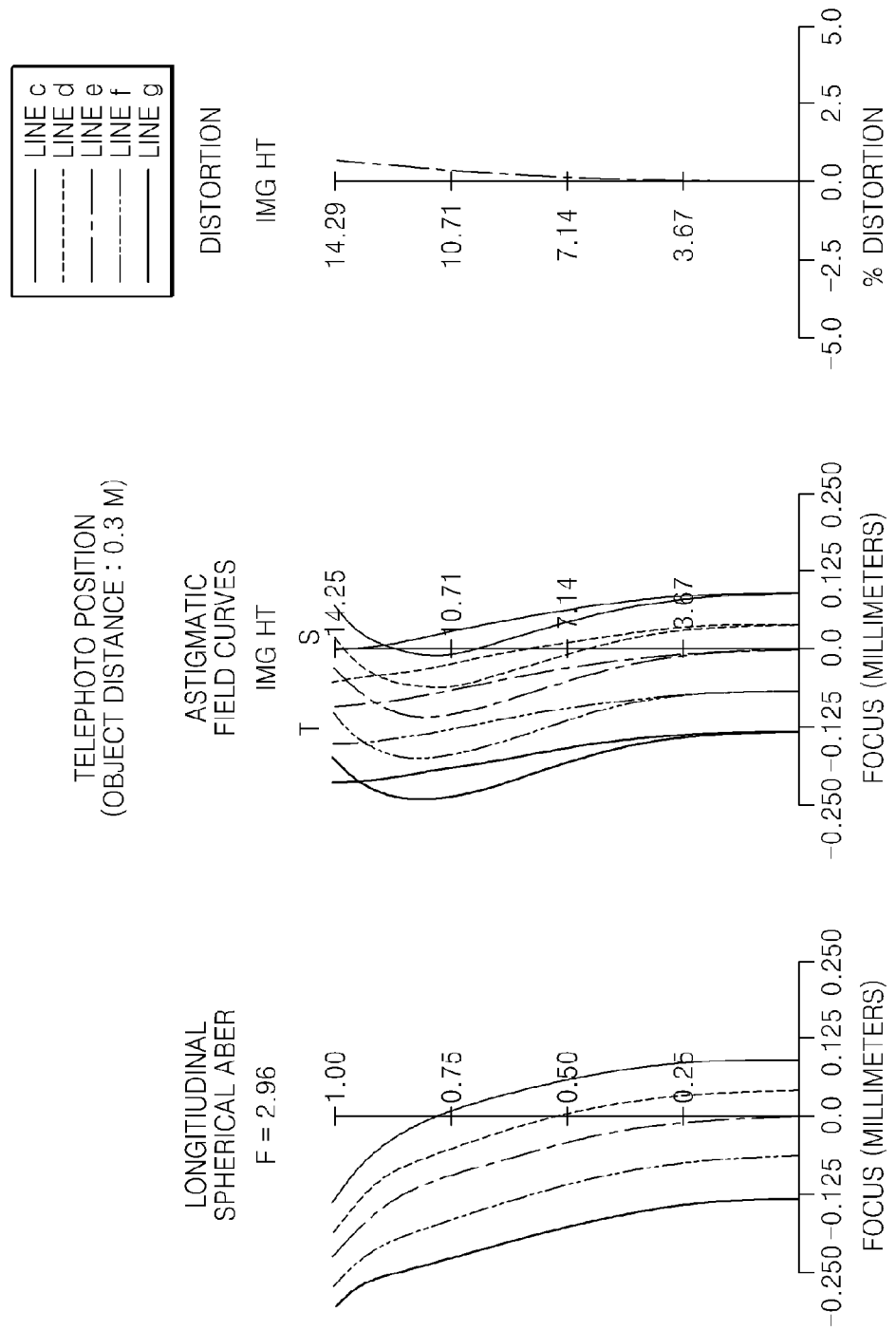
FIG. 14 is an aberration diagram illustrating longitudinal spherical aberration, astigmatism, and distortion of the zoom lens of FIG. 8 at the telephoto position when an object distance is 0.3 m.
Figure 15:
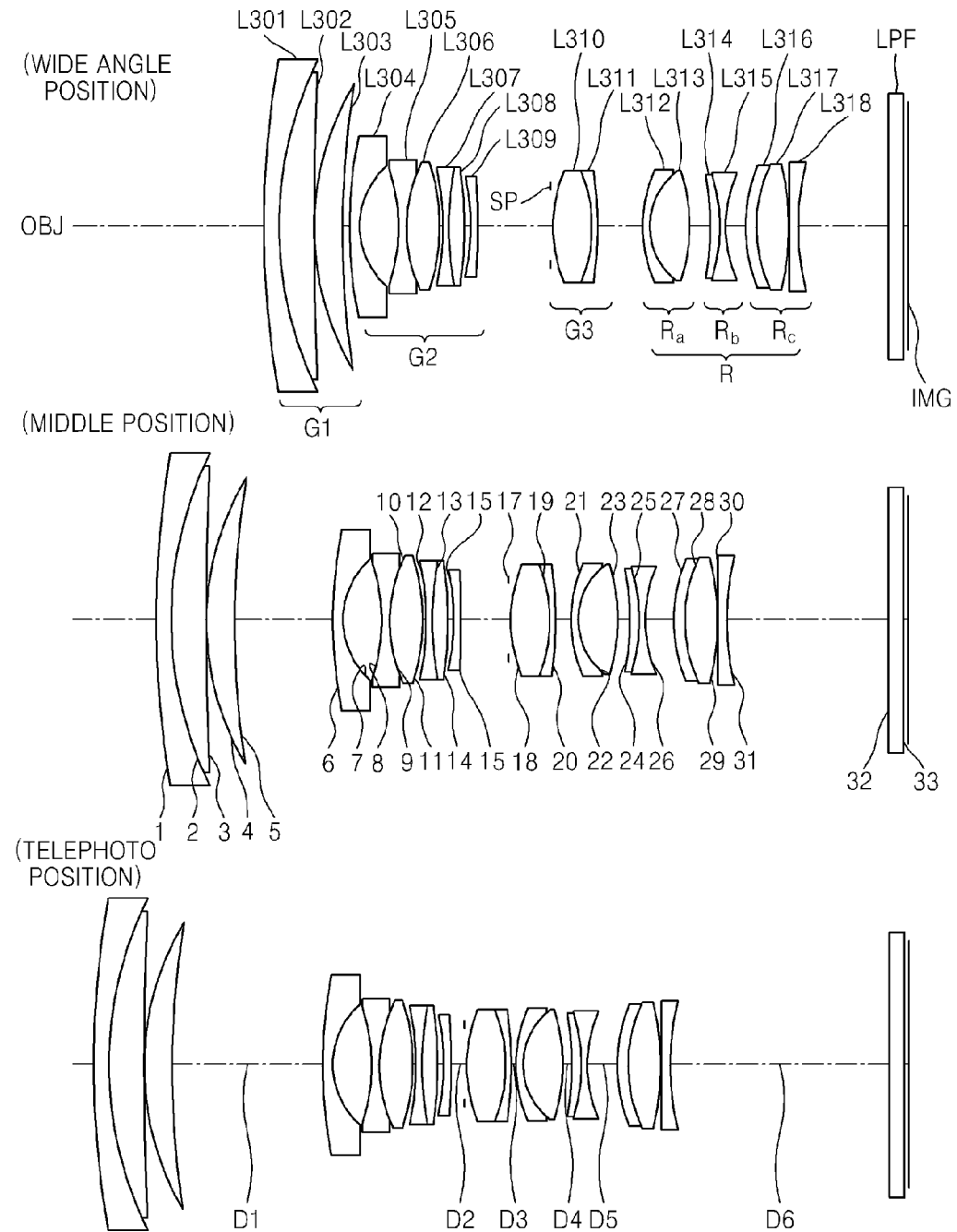
FIG. 15 is a diagram illustrating an optical arrangement of a zoom lens at a wide angle position, a middle position, and a telephoto position, according to another embodiment of the present disclosure.
Figure 16:
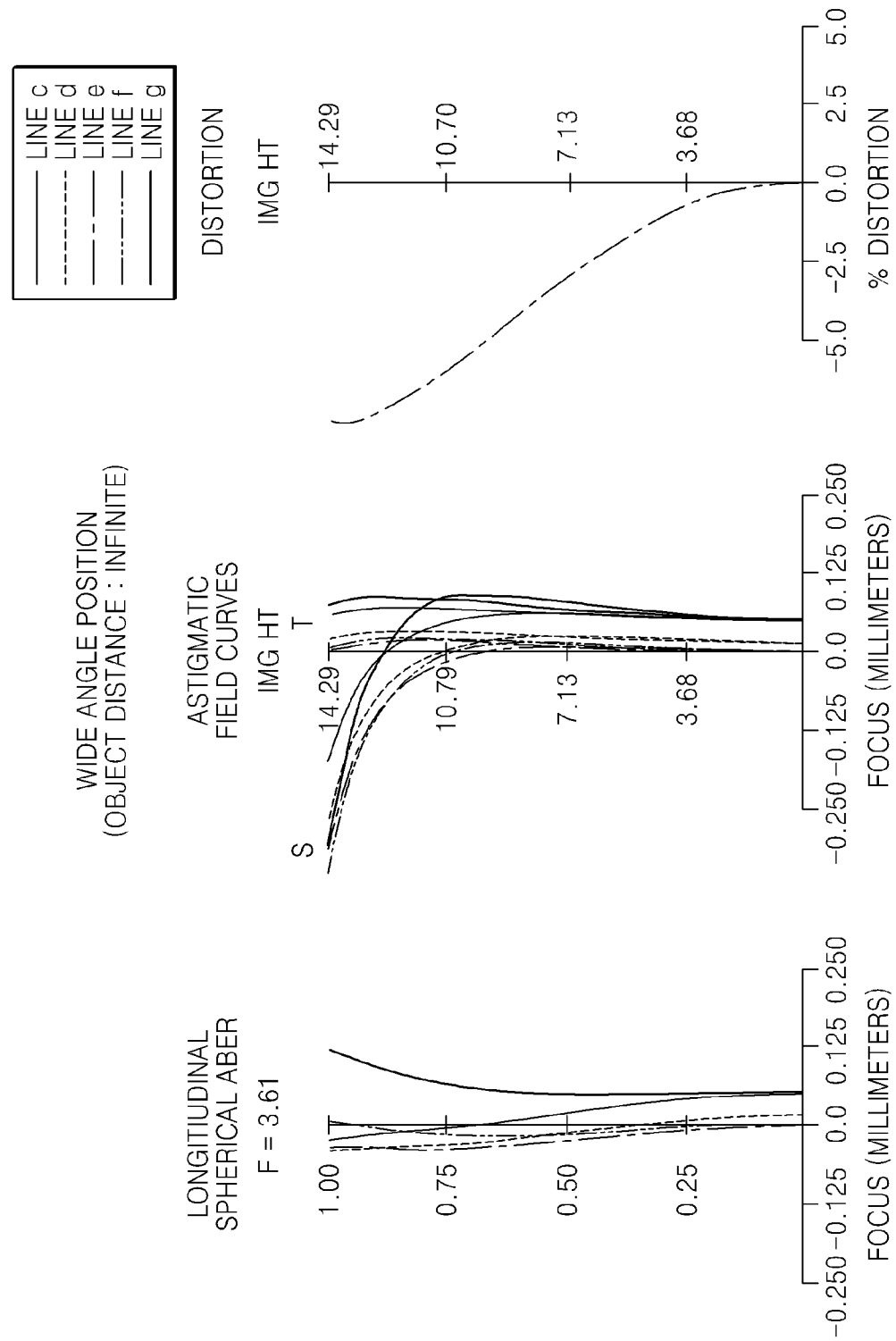
FIG. 16 is an aberration diagram illustrating longitudinal spherical aberration, astigmatism, and distortion of the zoom lens of FIG. 15 at the wide angle position when an object distance is infinite.
Figure 17:
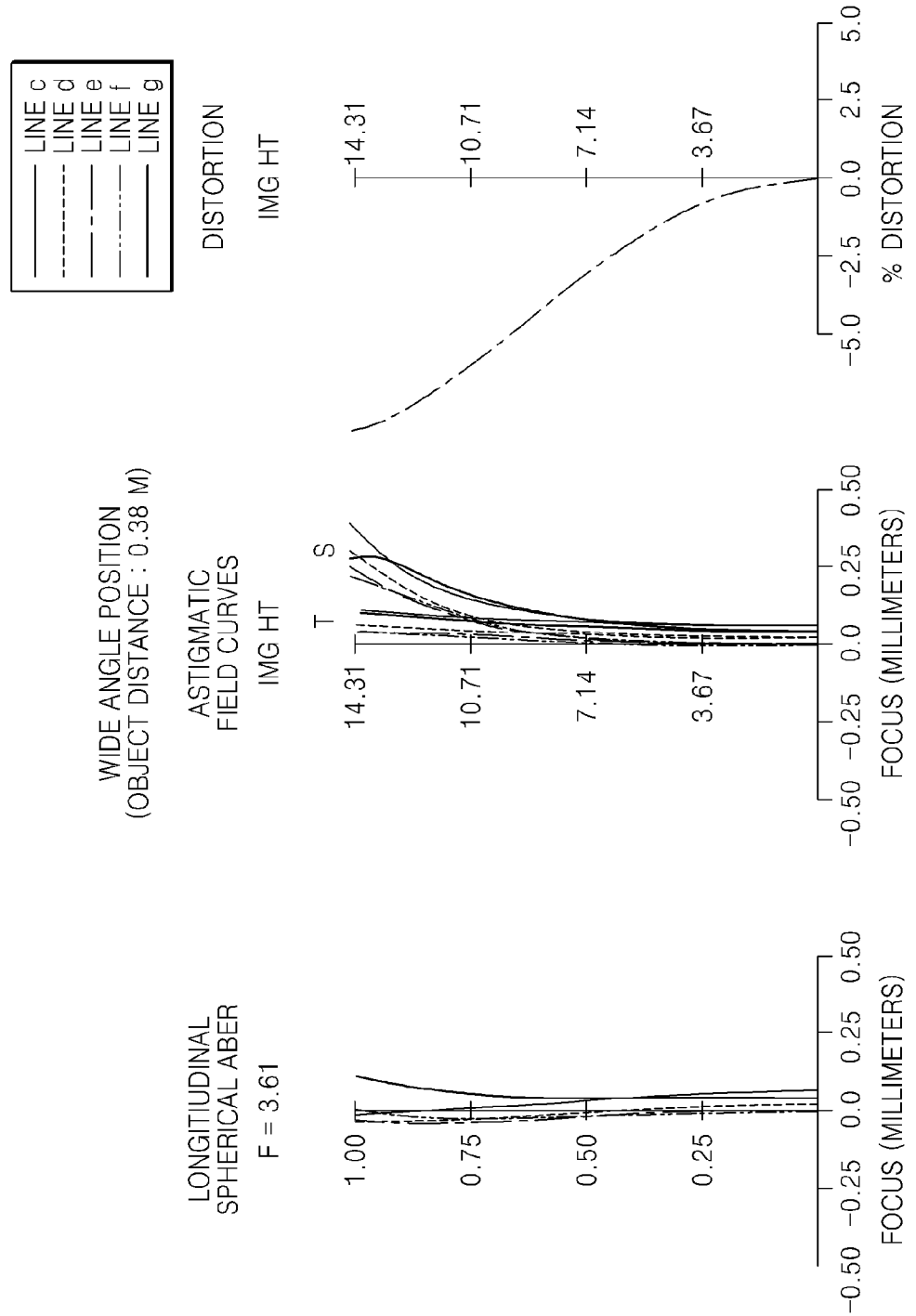
FIG. 17 is an aberration diagram illustrating longitudinal spherical aberration, astigmatism, and distortion of the zoom lens of FIG. 15 at the wide angle position when an object distance is 0.38 m.
Figure 18:
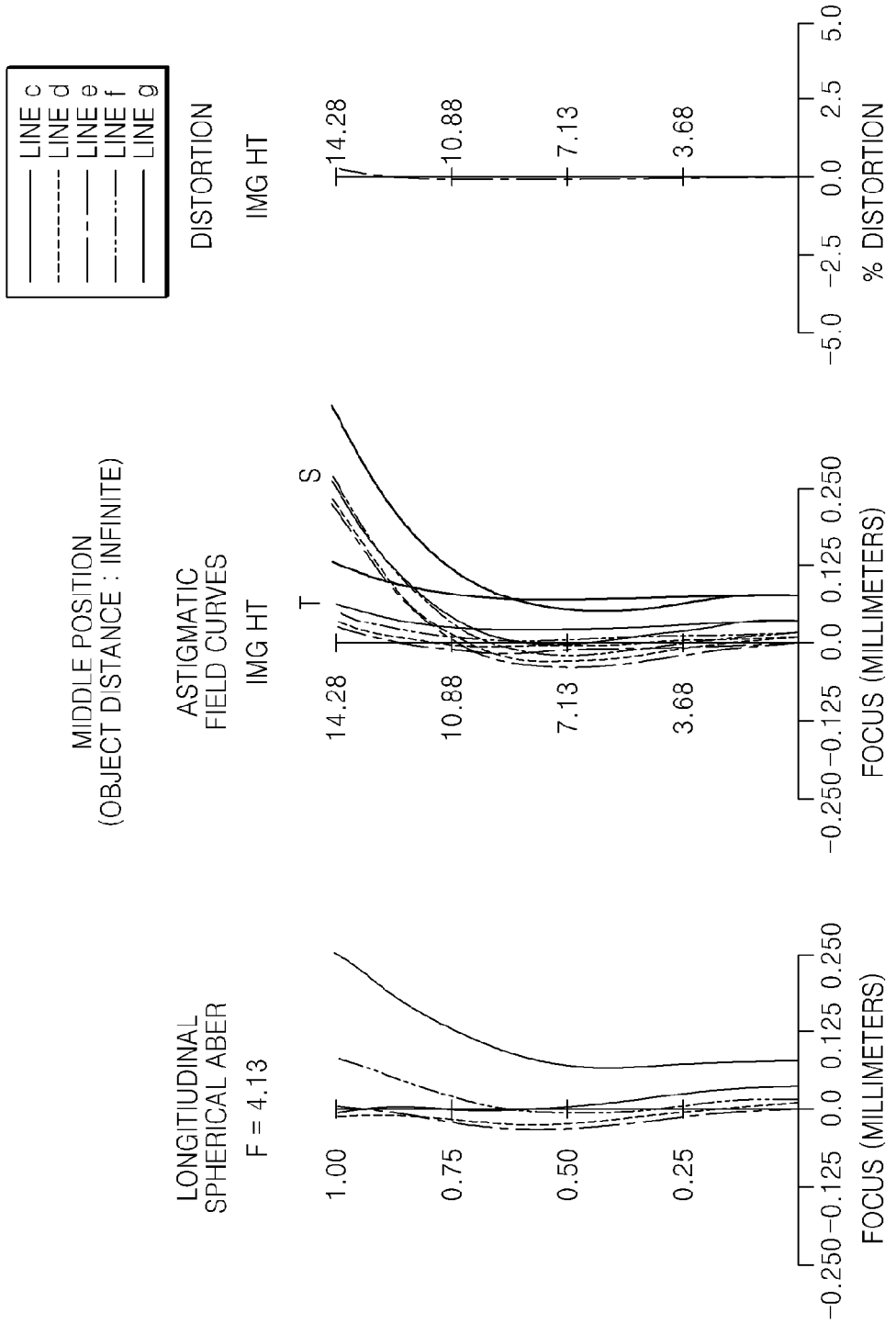
FIG. 18 is an aberration diagram illustrating longitudinal spherical aberration, astigmatism, and distortion of the zoom lens of FIG. 15 at the middle position when an object distance is infinite.
Figure 19:
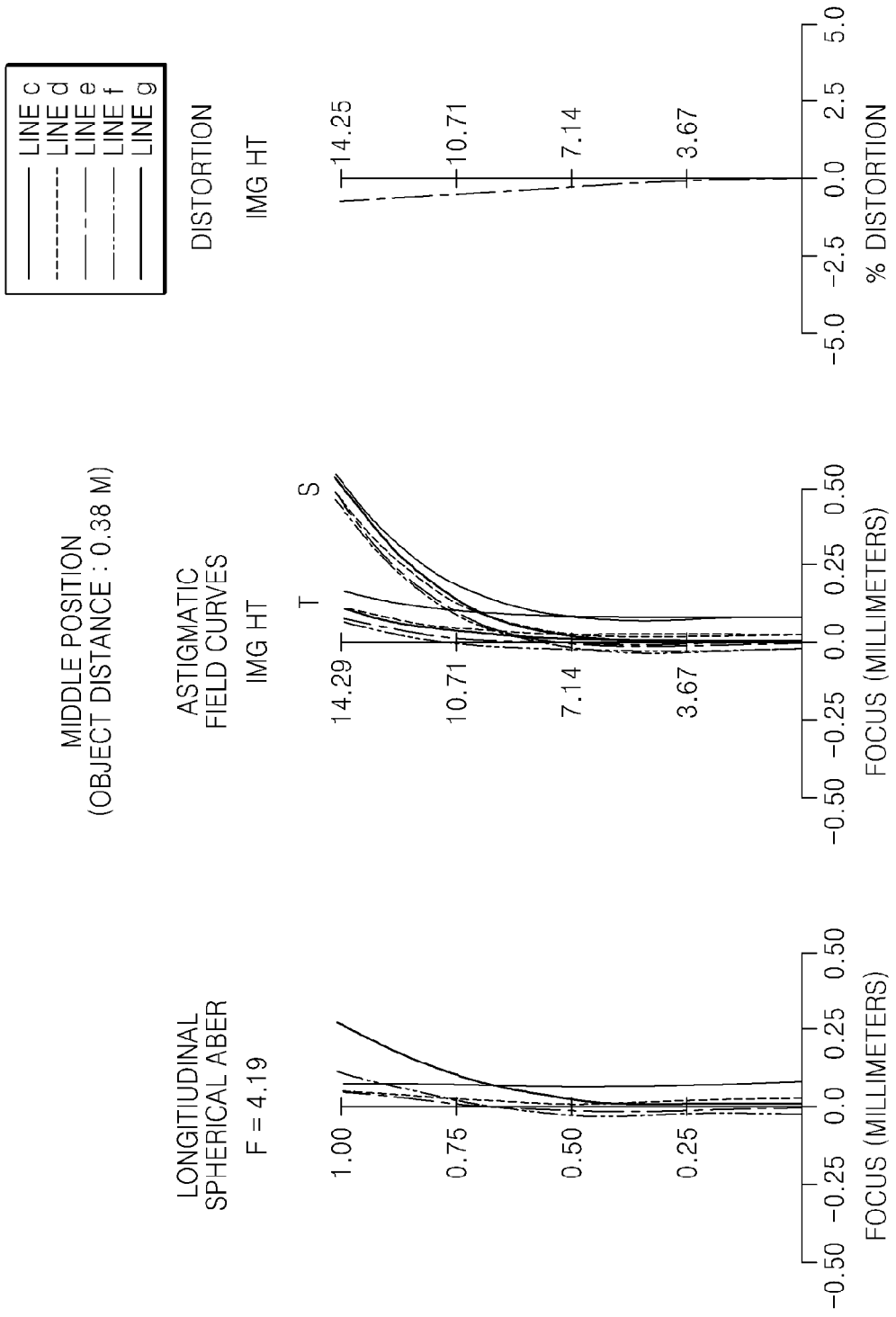
FIG. 19 is an aberration diagram illustrating longitudinal spherical aberration, astigmatism, and distortion of the zoom lens of FIG. 15 at the middle position when an object distance is 0.38 m.
Figure 20:
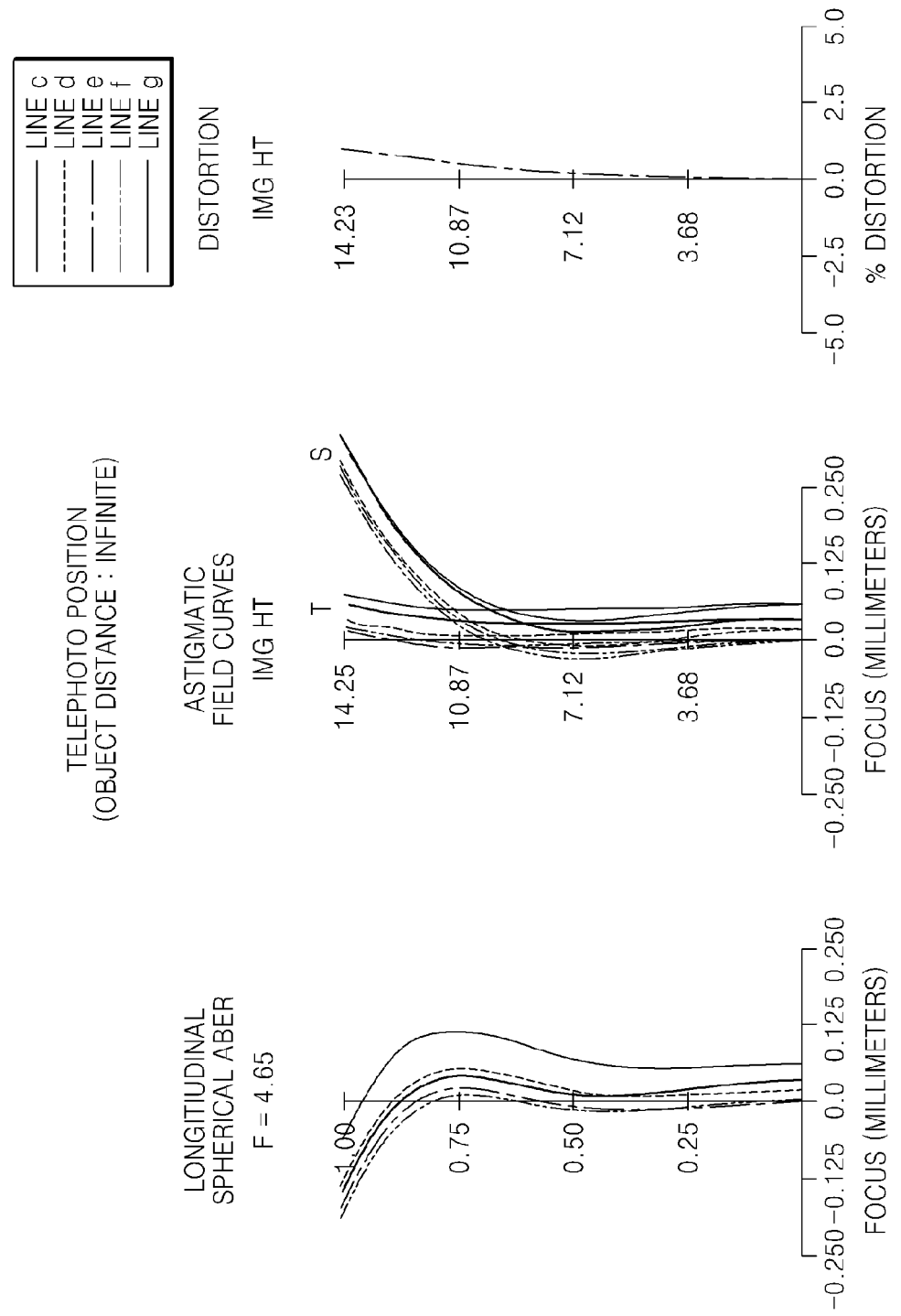
FIG. 20 is an aberration diagram illustrating longitudinal spherical aberration, astigmatism, and distortion of the zoom lens of FIG. 15 at the telephoto position when an object distance is infinite.
Figure 21:
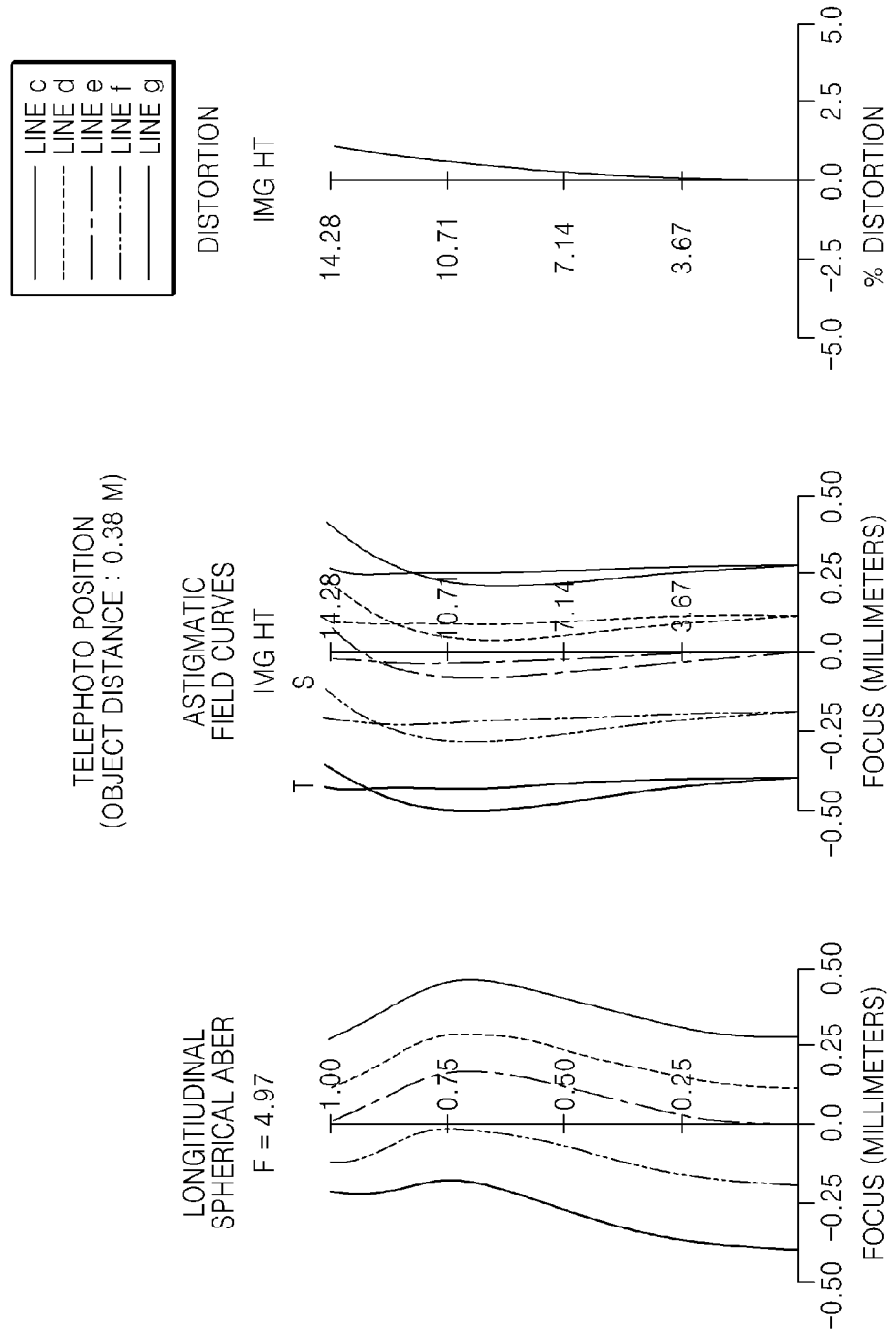
FIG. 21 is an aberration diagram illustrating longitudinal spherical aberration, astigmatism, and distortion of the zoom lens of FIG. 15 at the telephoto position when an object distance is 0.38 m.

FIGS. 1, 8, and 15 are diagrams respectively illustrating optical arrangements of zoom lenses according to embodiments of the present disclosure.

Referring to FIGS. 1, 8, and 15, the zoom lens includes a first lens group G1 having a positive refractive power, a second lens group G2 having a negative refractive power, a third lens group G3 having a positive refractive power, and a rear lens group R having a positive refractive power. The lens groups are sequentially disposed from an object OBJ side.

During zooming from a wide angle position to a telephoto position, an interval between the first lens group G1 and the second lens group G2 is increased, and an interval between the second lens group G2 and the third lens group G3 is decreased.

The rear lens group R includes a first sub-group Ra having a positive refractive power, a second sub-group Rb having a negative refractive power, and a third sub-group Rc having a positive refractive power, which are disposed in this order from the object OBJ side. The rear lens group R performs focusing within a close range by moving the second sub-group Rb toward an image surface IMG.

According to this configuration, since light flux that is incident on the second sub-group Rb having a negative refractive power (i.e., a focusing group) converges on the first sub-group Ra having a positive refractive power, the second sub-group Rb (i.e., a focusing group) may be easily reduced in size and weight.

In addition, the first sub-group Ra having a positive refractive power and the third sub-group Rc having a positive refractive power are respectively disposed on the object OBJ side and the image surface IMG side of the second sub-group Rb (i.e., a focusing group), and thus the degree of freedom in setting a lateral magnification of the second sub-group Rb having a negative refractive power is increased, thereby facilitating the control of the focusing sensitivity of the second sub-group Rb.

Furthermore, in the zoom lenses according to the embodiments, the rear lens group R having a positive refractive power is disposed independently from the first lens group G1 having a positive refractive power, the second lens group G2 having a negative refractive power, and the third lens group G3 having a positive refractive power, and thus the zoom lenses may easily secure a magnification ratio.

In addition, during zooming from the wide angle position to the telephoto position, it is preferable to configure an interval between the rear lens group R and the lens group on the object OBJ side of the rear lens group R to be reduced. In this case, the magnification ratio may be easily secured.

The zoom lenses according to the embodiments of FIGS. 1 and 8 may further include a fourth lens group G4 having a negative refractive power between the third lens group G3 and the rear lens group R.

In this case, during zooming from the wide angle position to the telephoto position, an interval between the first lens group G1 and the second lens group G2 is increased, an interval between the second lens group G2 and the third lens group G3 is decreased, an interval between the third lens group G3 and the fourth lens group G4 is increased, and an interval between the fourth lens group G4 and the rear lens group R is decreased. Based on such a configuration, the magnification ratio and a satisfactory optical performance may be easily secured.

The zoom lenses according to the embodiments may satisfy the following Conditions.

$$0.2 < frt/ft < 1.8 \tag{1}$$

$$0.2 < |fb|/frt < 1.0 \tag{2}$$

Here, "frt" denotes a focal length of the rear lens group R at the telephoto position, "fb" denotes a focal length of the second sub-group Rb, and "ft" denotes a focal length of the zoom lens at the telephoto position.

Condition (1) relates to the focal length of the rear lens group R having a positive refractive power. When frt/ft of the zoom lenses exceeds the upper limit of Condition (1), a magnification ratio may not be secured. When frt/ft of the zoom lenses is less than the lower limit of Condition (1), spherical aberration according to zooming fluctuates significantly.

Condition (2) relates to the focal length of the second sub-group Rb having a negative refractive power. When |fb|/frt of the zoom lenses exceeds the upper limit of Condition (2), the movement of the second sub-group Rb when focusing at the telephoto position is excessively increased. When |fb|/frt the zoom lenses is less than the lower limit of Condition (2), it is particularly difficult to suppress the fluctuation of the spherical aberration due to focusing at the telephoto position. Conditions (1) and (2) may be established as follows.

$$0.4 < frt/ft < 1.6 \tag{1a}$$

$$0.4 < |fb|/frt < 0.8 \tag{2a}$$

The first sub-group Ra having a positive refractive power may have at least one aspheric surface in which its positive refractive power is decreased toward a peripheral portion thereof. In addition, the first sub-group Ra may include a cemented lens in which a negative lens and a positive lens are bonded to each other.

An aspheric surface in which positive refractive power is decreased toward a peripheral portion thereof is used in the first sub-group Ra so that spherical aberration occurring on the object OBJ side of the second sub-group Rb (i.e., a focusing group) may be satisfactorily corrected, and particularly, at the telephoto position. Thus, it is easy to suppress the fluctuation of the spherical aberration when focusing in the nearest position. In addition, the zoom lenses include the cemented lens in which a negative lens and a positive lens are bonded to each other so that axial chromatic aberration occurring on the object OBJ side of the second sub-group Rb (i.e., a focusing group) may be easily corrected, and particularly, at the telephoto position. Thus, it is easy to suppress the fluctuation of the axial chromatic aberration due to focusing within a close range. In addition, based on such a configuration, the negative distortion may be easily corrected at the wide angle position, and magnification chromatic aberration may be easily corrected at the wide angle position.

In addition, the zoom lenses according to the embodiments may satisfy the following Condition.

$$0.2 < fa/frt < 0.9 \tag{3}$$

Here, "fa" denotes a focal length of the first sub-group Ra.

Condition (3) relates to the focal length of the first sub-group Ra. When fa/frt of the zoom lenses exceeds the upper limit of Condition (3), the second sub-group Rb (i.e., a focusing group) may not be reduced in size. When fa/frt of the zoom lenses is less than the lower limit of Condition (3), it is particularly difficult to correct spherical aberration at the telephoto position and negative distortion at the wide angle position.

A numerical range of Condition (3) may be established as follows.

$$0.4 < fa/frt < 0.7 \tag{3a}$$

In addition, the zoom lenses according to the embodiments may satisfy the following Condition.

$$0.5 < fc/frt < 3.0 \tag{4}$$

Here, "fc" denotes a focal length of the third sub-group Rc.

Condition (4) relates to the focal length of the third sub-group Rc. When fc/frt of the zoom lenses exceeds the upper limit of Condition (4), a back focal length may not be secured at the wide angle position. When fc/frt of the zoom lenses is less than the lower limit of Condition (4), it is particularly difficult to correct negative distortion at the wide angle position.

A numerical range of Condition (4) may be established as follows.

$$0.8 < fc/frt < 2.5 \tag{4a}$$

The third sub-group Rc may have at least one aspheric surface in which its positive refractive power is decreased toward a peripheral portion thereof. In addition, the third sub-group Rc may include a cemented lens in which a negative lens and a positive lens are bonded to each other.

In addition, the zoom lenses according to the embodiments may satisfy the following Conditions.

$$0.3 < f1/ft < 2.5 \tag{5}$$

$$0.05 < |f2|/ft < 0.5 \tag{6}$$

$$0.1 < f3/ft < 1.0 \tag{7}$$

Here, "f1", "f2", and "f3" respectively denote focal lengths of the first lens group G1, the second lens group G2, and the third lens group G3, and "ft" denotes a focal length of the zoom lens at the telephoto position.

Condition (5) relates to the focal length of the first lens group G1 having a positive refractive power. When f1/ft of the zoom lenses is in a range less than the upper limit of Condition (5), the overall optical length may be easily reduced. When f1/ft of the zoom lenses is in a range greater than the lower limit of Condition (5), spherical aberration may be easily corrected at the telephoto position.

Condition (6) relates to the focal length of the second lens group G2 having a negative refractive power. When |f2|/ft of the zoom lenses is in a range less than the upper limit of Condition (6), a magnification ratio may be easily secured. When |f2|/ft of the zoom lenses is in a range greater than the lower limit of Condition (6), distortion may be easily corrected at the wide angle position.

Condition (7) relates to the focal length of the third lens group G3 having a positive refractive power. When f3/ft of the zoom lenses is in a range less than the upper limit of Condition (7), a magnification ratio may be easily secured. When the f3/ft of the zoom lenses is in a range greater than the lower limit of Condition (7), spherical aberration may be easily corrected at the telephoto position.

Numerical ranges of the Conditions (5), (6), and (7) may be established as follows.

$$0.35 < f1/ft < 2.0 \quad (5a)$$

$$0.05 < |f2|/ft < 0.35 \quad (6a)$$

$$0.1 < f3/ft < 0.6 \quad (7a)$$

In addition, the zoom lenses according to the embodiments may satisfy the following Condition.

$$0.2 < |f4|/ft < 2.5 \quad (8)$$

Here, "f4" denotes a focal length of the fourth lens group G4.

Condition (8) relates to the focal length of the fourth lens group G4. When |f4|/ft of the zoom lenses is in a range less than the upper limit of Condition (8), magnification ratio may be easily secured. When |f4|/ft of the zoom lenses is in a range greater than a lower limit of Condition (8), the flare of upper light flux in off-axis light flux may be easily corrected at the middle position.

A numerical range of Condition (8) may be established as follows.

$$0.25 < |f4|/ft < 2.0 \quad (8a)$$

The zoom lenses according to the embodiments may include a vibration-proof mechanism for compensating for image blur due to unwanted vibration that is applied to a photographing system. Any lens group, other than the first lens group G1, may be moved in a direction perpendicular to an optical axis in order to prevent vibration from occurring.

For example, in the embodiment shown in FIG. 15, the cemented lens within the second lens group G2 may be moved in a direction perpendicular to the optical axis in order to prevent vibration from occurring. Alternatively, in the embodiments shown in FIGS. 1 and 8, two lenses in the fourth lens group G4 on the object OBJ side may be moved in a direction perpendicular to the optical axis in order to prevent vibration from occurring.

Hereinafter, detailed lens data of the zoom lenses according to the embodiments will be described.

Table 1 shows the embodiments shown in FIGS. 1, 8, and 15 satisfying Conditions (1) to (8).

TABLE 1

|  | Embodiment of FIG. 1 | Embodiment of FIG. 8 | Embodiment of FIG. 15 |
|---|---|---|---|
| (1) frt/ft | 1.432 | 1.249 | 0.601 |
| (2) |fb|/frt | 0.548 | 0.620 | 0.658 |
| (3) fa/frt | 0.533 | 0.551 | 0.541 |
| (4) fc/frt | 1.187 | 1.457 | 1.965 |
| (5) f1/ft | 1.952 | 1.833 | 1.052 |
| (6) |f2|/ft | 0.322 | 0.285 | 0.160 |
| (7) f3/ft | 0.562 | 0.494 | 0.542 |
| (8) |f4|/ft | 1.875 | 1.292 | — |

In each of the embodiments, a surface number i represents an order of optical surfaces from the object OBJ side toward an image surface IMG side.

With respect to the surface number i, "R" denotes a curvature radius of the i-th optical surface, "D" denotes a surface interval between an i-th surface and an i+1-th surface, and "nd" and "vd" respectively denote a refractive index with respect to a d-line and Abbe number of an i-th optical member material.

A unit of length is mm.

A mark "*" before the surface number represents that the surface is an aspheric surface.

In each of the embodiments, the shape of the aspheric surface of the lens is expressed by the following equation:

$$x = \frac{Ch^2}{1 + \sqrt{1 - (1+K)C^2h^2}} + A_4 h^4 + A_6 h^6 + A_8 h^8 + A_{10} h^{10} \quad (1)$$

Here, when an optical axis direction is an x-axis, a direction perpendicular to an optical axis is a y-axis, and a traveling direction of a light beam is a positive direction, "x" denotes a distance in the optical axis (x-axis) direction at the apex of the lens, "h" denotes a distance in the direction (y-axis) perpendicular to the optical axis, "K" denotes a conic constant, "A4", "A6", "A8", and "A10" denote aspheric coefficients, and "c" denotes a reciprocal number of a curvature radius (1/R) at the apex of the lens.

In addition, a mark "E-Z" in aspheric surface data denotes "10-Z".

(Embodiment of FIG. 1)

Table 2 shows lens surface data of the embodiment shown in FIG. 1.

TABLE 2

| Surface # | R | D | nd | vd |
|---|---|---|---|---|
| 1 | 255.8468 | 2.00 | 1.8467 | 23.8 |
| 2 | 78.1198 | 6.03 | 1.7292 | 54.7 |
| 3 | 675.0000 | 0.15 | | |
| 4 | 48.5342 | 6.00 | 1.7725 | 49.6 |
| 5 | 121.3923 | D1 | | |
| *6 | 100.3003 | 1.90 | 1.8047 | 40.9 |
| 7 | 13.1814 | 7.70 | | |
| 8 | −23.9577 | 1.20 | 1.8810 | 40.2 |
| 9 | 100.7248 | 1.06 | | |
| 10 | 49.0696 | 5.91 | 1.8052 | 25.5 |
| 11 | −21.1405 | 0.60 | | |
| 12 | −18.1774 | 1.92 | 1.8348 | 42.7 |
| 13 | −40.0354 | D2 | | |
| 14 (SP) | ∞ | 0.50 | | |
| *15 | 42.2909 | 4.00 | 1.5154 | 63.2 |
| 16 | −40.7920 | 1.20 | 1.8467 | 23.8 |
| 17 | −516.5281 | 0.15 | | |
| 18 | 56.1160 | 5.16 | 1.6516 | 58.6 |
| 19 | −30.3370 | D3 | | |

TABLE 2-continued

| Surface # | R | D | nd | vd |
|---|---|---|---|---|
| 20 | −81.5934 | 1.00 | 1.6968 | 55.5 |
| 21 | 27.0733 | 0.40 | | |
| 22 | 23.9653 | 1.97 | 1.8467 | 23.8 |
| 23 | 36.8105 | 0.50 | | |
| 24 | 22.2231 | 2.58 | 1.4875 | 70.4 |
| 25 | 42.5759 | D4 | | |
| *26 | 39.9239 | 1.30 | 1.6838 | 31.6 |
| 27 | 18.5145 | 8.10 | 1.4970 | 81.6 |
| 28 | −23.7564 | D5 | | |
| 29 | 191.4336 | 1.74 | 1.8052 | 25.5 |
| 30 | −68.1570 | 0.80 | 1.7015 | 41.1 |
| 31 | 21.8622 | D6 | | |
| 32 | 55.7168 | 5.46 | 1.4970 | 81.6 |
| 33 | −23.0838 | 1.30 | 1.6838 | 31.6 |
| *34 | −59.6498 | D7 | | |
| 35 | ∞ | 2.00 | 1.5168 | 64.2 |
| 36 | ∞ | 1.00 | | |

Table 3 shows data regarding variable distances during zooming in the embodiment shown in FIG. 1.

TABLE 3

| | f = 16.5 | f = 30.0 | f = 48.5 |
|---|---|---|---|
| D1 | 1.21 | 14.13 | 28.04 |
| D2 | 19.85 | 7.41 | 1.55 |
| D3 | 0.50 | 3.40 | 4.10 |
| D4 | 5.05 | 2.15 | 1.46 |
| D5 | 2.31 | 1.67 | 1.52 |
| D6 | 6.13 | 6.77 | 6.92 |
| D7 | 17.70 | 27.71 | 35.21 |

Table 4 shows aspheric coefficients in the embodiment shown in FIG. 1.

TABLE 4

| Surface # | R | K | A4 | A6 | A8 | A10 |
|---|---|---|---|---|---|---|
| *6 | 100.3003 | 0.0 | 1.4457E−05 | −2.6643E−08 | 0.0 | 0.0 |
| *15 | 42.2909 | 0.0 | −1.6141E−05 | −3.0208E−08 | 0.0 | 0.0 |
| *26 | 39.9239 | 0.0 | −3.6495E−05 | −2.4544E−08 | 9.5727E−11 | 0.0 |
| *34 | −59.6498 | 0.0 | −3.3573E−06 | −2.3728E−08 | 5.6692E−11 | 0.0 |

FIG. 1 is a diagram showing an optical arrangement of the zoom lens at a wide angle position, a middle position, and a telephoto position, according to an embodiment of the present disclosure.

The zoom lens includes the first lens group G1 having a positive refractive power, the second lens group G2 having a negative refractive power, the third lens group G3 having a positive refractive power, the fourth lens group G4 having a negative refractive power, and the rear lens group R having a positive refractive power, which are sequentially disposed from an object OBJ side. An optical filter, e.g., a low pass filter LPF, is disposed between the rear lens group R and the image surface IMG.

The first lens group G1 includes a cemented lens in which a meniscus lens L101 having a surface that is convex toward the object OBJ side and a lens L102 having a surface convex toward object OBJ side are bonded to each other, and a meniscus lens L103 having a surface that is convex toward the object OBJ side, wherein the meniscus lens L101, the bi-convex lens L102, and the meniscus lens L103 are sequentially disposed from the object OBJ side.

The second lens group G2 includes a meniscus lens L104 having a surface that is convex toward the object side, a bi-concave lens L105, a bi-convex lens L106, and a meniscus lens L107 having a surface that is convex toward image surface IMG, wherein the meniscus lens L104, the bi-concave lens L105, the bi-convex lens L106, and the meniscus lens L107 are sequentially disposed from the object OBJ side.

An aperture stop SP is disposed on the object OBJ side of the third lens group G3.

The third lens group G3 includes a cemented lens in which a bi-convex lens L108 and a meniscus lens L109 having a surface that is convex toward the image surface IMG side are bonded to each other, and a bi-convex lens L110, wherein the bi-convex lens L108, the meniscus lens L109, and the bi-convex lens L110 are sequentially disposed from the object OBJ side.

The fourth lens group G4 includes a bi-concave lens L111, a meniscus lens L112 having a surface that is convex toward the object OBJ side, and a meniscus lens L113 having a surface that is convex toward the object OBJ side.

In addition, the rear lens group R includes the first sub-group Ra having a positive refractive power, the second sub-group Rb having a negative refractive power, and the third sub-group Rc having a positive refractive power, wherein the first sub-group Ra, the second sub-group Rb, and the third sub-group Rc are sequentially disposed from the object OBJ side.

The first sub-group Ra includes a meniscus lens L114 having a surface that is convex toward the object OBJ side, and a bi-convex lens L115. The second sub-group Rb having a negative refractive power includes a cemented lens in which a bi-convex lens L116 and a bi-concave lens L117 are bonded to each other. The third sub-group Rc having a positive refractive power includes a cemented lens in which a bi-convex lens L118 and a meniscus lens L119 having a surface that is convex toward the image surface IMG side.

During zooming from the wide angle position to the telephoto position, an interval between the first lens group G1 having a positive refractive power and the second lens group G2 having a negative refractive power is increased, an interval between the second lens group G2 having a negative refractive power and the third lens group G3 having a positive refractive power is decreased, an interval between the third lens group G3 having a positive refractive power and the fourth lens group G4 having a negative refractive power is increased, and an interval between the fourth lens group G4 having a negative refractive power and the rear lens group R having a positive refractive power is decreased.

In addition, at the time of focusing in the nearest position, focusing is performed by moving the second sub-group Rb toward the image surface IMG side.

Table 5 below shows the movement of the second sub-group Rb during focusing when an object distance is 0.3 m.

TABLE 5

| f = 16.5 | f = 30.0 | f = 48.5 |
|---|---|---|
| 0.849 | 2.014 | 4.193 |

FIGS. 2 to 7 are aberration diagrams of the zoom lens in the embodiment shown in FIG. 1.

Each of the aberration diagrams shows spherical aberration, astigmatism, and distortion in this order from the left, and shows a case where the object distance is infinite or 0.3 m. In addition, the astigmatism shows the deviation S of a sagittal imaging point and the deviation T of a meridional imaging point from a paraxial image surface.

From these aberration diagrams, it may be seen that the chromatic aberration is corrected from the wide angle position to the telephoto position in a balanced manner.

(Embodiment of FIG. 8)

Table 6 shows lens surface data of the embodiment shown in FIG. 8.

TABLE 6

| Surface # | R | D | nd | vd |
|---|---|---|---|---|
| 1 | 500.0000 | 2.00 | 1.8467 | 23.8 |
| 2 | 84.5370 | 6.83 | 1.7292 | 54.7 |
| 3 | −743.1354 | 0.15 | | |
| 4 | 42.9256 | 5.79 | 1.7725 | 49.6 |
| 5 | 90.3614 | D1 | | |
| *6 | 66.0743 | 1.90 | 1.8047 | 40.9 |
| 7 | 11.5889 | 7.32 | | |
| 8 | −22.0046 | 1.20 | 1.8810 | 40.2 |
| 9 | 70.5094 | 0.17 | | |
| 10 | 37.0293 | 5.49 | 1.8052 | 25.5 |
| 11 | −18.6056 | 0.39 | | |
| 12 | −16.5592 | 1.20 | 1.8348 | 42.7 |
| 13 | −40.0000 | D2 | | |
| 14 (SP) | ∞ | 0.64 | | |
| 15 | 31.1524 | 6.35 | 1.4875 | 70.4 |
| 16 | −22.6907 | 1.20 | 1.7552 | 27.5 |
| 17 | 105.8132 | 0.16 | | |
| *18 | 40.3169 | 5.53 | 1.8047 | 40.9 |
| 19 | −28.1621 | D3 | | |
| 20 | −98.7094 | 1.00 | 1.6968 | 55.5 |
| 21 | 25.0614 | 0.39 | | |
| 22 | 22.3678 | 1.83 | 1.8467 | 23.8 |
| 23 | 32.5840 | 0.50 | | |
| 24 | 23.0000 | 1.82 | 1.4875 | 70.4 |
| 25 | 33.6174 | D4 | | |
| *26 | 30.8317 | 1.50 | 1.6838 | 31.6 |
| 27 | 16.8556 | 7.74 | 1.4970 | 81.6 |
| 28 | −24.5697 | D5 | | |
| 29 | 80.0438 | 1.30 | 1.8348 | 42.7 |
| 30 | 22.4577 | D6 | | |
| 31 | 39.7121 | 4.18 | 1.4970 | 81.6 |
| 32 | −50.3503 | 1.50 | 1.6838 | 31.6 |
| *33 | −271.4531 | D7 | | |
| 34 | ∞ | 2.00 | 1.5168 | 64.2 |
| 35 | ∞ | 1.00 | | |

Table 7 shows data regarding variable distances during zooming in the embodiment shown in FIG. 8.

TABLE 7

| | f = 16.5 | f = 30.0 | f = 48.5 |
|---|---|---|---|
| D1 | 1.20 | 13.66 | 27.34 |
| D2 | 16.46 | 5.85 | 1.55 |
| D3 | 0.50 | 3.27 | 4.23 |
| D4 | 5.05 | 2.28 | 1.31 |
| D5 | 1.73 | 2.10 | 1.52 |
| D6 | 6.45 | 6.08 | 6.66 |
| D7 | 18.21 | 26.57 | 33.52 |

Table 8 shows the aspheric coefficients in the embodiment shown in FIG. 8.

TABLE 8

| Surface # | R | K | A4 | A6 | A8 | A10 |
|---|---|---|---|---|---|---|
| *6 | 66.0743 | 0.0 | 1.5544E−05 | −3.5613E−08 | 0.0 | 0.0 |
| *18 | 40.3169 | 0.0 | −2.0639E−05 | −9.4724E−09 | 0.0 | 0.0 |
| *26 | 30.8317 | 0.0 | −3.1874E−05 | −3.7854E−09 | 7.1642E−11 | 0.0 |
| *33 | −271.4531 | 0.0 | −2.1129E−07 | −3.1543E−08 | 1.1934E−10 | 0.0 |

FIG. 8 is a diagram illustrating an optical arrangement of the zoom lens at a wide angle position, a middle position, and a telephoto position, according to another embodiment of the present disclosure.

The zoom lens includes the first lens group G1 having a positive refractive power, the second lens group G2 having a negative refractive power, the third lens group G3 having a positive refractive power, the fourth lens group G4 having a negative refractive power, and the rear lens group R having a positive refractive power, which are sequentially disposed from the object OBJ side.

The lens configuration of the current embodiment is basically the same as the embodiment shown in FIG. 1, and thus the lenses of the current embodiment, which correspond to the lenses of the embodiment shown in FIG. 1, are denoted by reference numerals in which the hundreds digit (third digit) of the reference number is replaced with "2".

In the zoom lens of the current embodiment, the second sub-group Rb of the rear lens group R includes one meniscus lens L217 having a surface that is convex toward the object OBJ, and there is no lens corresponding to lens L116 of the embodiment shown in FIG. 1.

At the time of focusing in the nearest position, focusing is performed by moving the second sub-group Rb toward the image surface IMG side.

Table 9 shows the movement the second sub-group Rb during focusing when an object distance is 0.3 m.

TABLE 9

| f = 16.5 | f = 30.0 | f = 48.5 |
|---|---|---|
| 0.795 | 1.994 | 4.079 |

FIGS. 9 to 14 are aberration diagrams of the zoom lens in the embodiment shown in FIG. 8.

From these aberration diagrams, it may be seen that the chromatic aberration is corrected from the wide angle position to the telephoto position in a balanced manner.

(Embodiment of FIG. 15)

Table 10 shows lens surface data of the embodiment shown in FIG. 15.

TABLE 10

| Surface # | R | D | nd | vd |
|---|---|---|---|---|
| 1 | 173.9428 | 2.00 | 1.8467 | 23.8 |
| 2 | 58.9194 | 5.88 | 1.7292 | 54.7 |
| 3 | 800.0000 | 0.15 | | |
| 4 | 45.9360 | 4.49 | 1.8042 | 46.5 |
| 5 | 107.7895 | D1 | | |
| 6 | 70.2766 | 1.30 | 1.8810 | 40.2 |
| 7 | 12.8415 | 6.48 | | |
| *8 | −37.8263 | 1.30 | 1.8047 | 40.9 |
| 9 | 29.6180 | 0.15 | | |
| 10 | 24.0669 | 5.23 | 1.8467 | 23.8 |
| 11 | −31.3963 | 0.55 | | |
| 12 | −45.3466 | 0.90 | 1.8348 | 42.7 |
| 13 | 56.6832 | 2.17 | 1.7408 | 27.8 |
| 14 | −86.3238 | 1.57 | | |
| 15 | −28.2362 | 1.00 | 1.8348 | 42.7 |
| 16 | −78.9027 | D2 | | |
| 17 (SP) | ∞ | 0.48 | | |
| *18 | 24.1522 | 6.09 | 1.5832 | 59.2 |
| 19 | −20.2804 | 1.00 | 1.7618 | 26.6 |
| 20 | −89.6321 | D3 | | |
| 21 | 21.9139 | 1.83 | 1.8348 | 42.7 |
| 22 | 11.8934 | 6.24 | 1.5892 | 60.6 |
| *23 | −24.7778 | D4 | | |
| 24 | −58.5945 | 1.65 | 1.7618 | 26.6 |
| 25 | −26.1151 | 0.80 | 1.5174 | 52.2 |
| 26 | 18.1087 | D5 | | |
| *27 | 31.5769 | 1.30 | 1.7391 | 49.0 |
| 28 | 19.1493 | 5.41 | 1.4970 | 81.6 |
| 29 | −43.5041 | 0.15 | | |
| 30 | 400.0000 | 1.50 | 1.5955 | 39.2 |
| 31 | 44.7291 | D6 | | |
| 32 | ∞ | 2.00 | 1.5168 | 64.2 |
| 33 | ∞ | 1.00 | | |

Table 11 shows data regarding variable distances during zooming in the embodiment shown in FIG. 15.

TABLE 11

| | f = 16.5 | f = 30.0 | f = 77.6 |
|---|---|---|---|
| D1 | 1.20 | 15.40 | 33.52 |
| D2 | 16.39 | 7.96 | 2.42 |
| D3 | 7.50 | 2.77 | 0.50 |
| D4 | 3.44 | 1.90 | 1.40 |
| D5 | 3.52 | 5.06 | 5.56 |
| D6 | 19.41 | 35.78 | 49.48 |

Table 12 shows aspheric coefficients in the embodiment shown in FIG. 15.

TABLE 12

| Surface # | R | K | A4 | A6 | A8 | A10 |
|---|---|---|---|---|---|---|
| *8 | −37.8263 | 0.0 | 1.2129E−06 | −2.7093E−08 | 0.0 | 0.0 |
| *18 | 24.1522 | 0.0 | −1.2809E−05 | −5.0248E−09 | 0.0 | 0.0 |
| *23 | −24.7778 | 0.0 | 4.5394E−05 | −1.3931E−07 | 0.0000E+00 | 0.0 |
| *27 | 31.5769 | 0.0 | 9.6493E−06 | −4.5691E−08 | 3.7488E−10 | 0.0 |

FIG. 15 is a diagram illustrating an optical arrangement of the zoom lens at a wide angle position, a middle position, and a telephoto position, according to another embodiment of the present disclosure.

The zoom lens according to the embodiment shown in FIG. 15 includes the first lens group G1 having a positive refractive power, the second lens group G2 having a negative refractive power, the third lens group G3 having a positive refractive power, and the rear lens group R having a positive refractive power, which are sequentially disposed from the object OBJ side. An optical filter, e.g., a low pass filter LPF, is disposed between the rear lens group R and the image surface IMG.

The first lens group G1 includes lenses L301, L302, and L303, and is basically the same as the first lens groups G1 of the embodiments shown in FIGS. 1 and 8.

The second lens group G2 includes a meniscus lens L304 having a surface that is convex on the object side, a bi-concave lens L305, a bi-convex lens L306, a cemented lens in which a bi-concave lens L307 and a bi-convex lens L308 are bonded to each other, and a meniscus lens L309 having a surface that is convex toward the image surface IMG side, wherein the meniscus lens L304, the bi-concave lens L305, the bi-convex lens L306, the bi-concave lens L307, the bi-convex lens L308, and the meniscus lens L309 are sequentially disposed from the object OBJ side.

The aperture stop SP is disposed on the object OBJ side of the third lens group G3.

The third lens group G3 includes a cemented lens in which a bi-convex lens L310 and a meniscus lens L311 having a surface that is convex on the image surface IMG side of the third lens group G3 are bonded to each other, wherein the bi-convex lens L310 and the meniscus lens L311 are sequentially disposed from the object OBJ side.

The rear lens group R includes the first sub-group Ra having a positive refractive power, the second sub-group Rb having a negative refractive power, and the third sub-group Rc having a positive refractive power, wherein the first sub-group Ra, the second sub-group Rb, and the third sub-group Rc are sequentially disposed from the object OBJ side.

The first sub-group Ra includes a cemented lens in which a meniscus lens L312 having a surface that is convex toward the object OBJ and a bi-convex lens L313 are bonded to each other. The second sub-group Rb having a negative refractive power includes a cemented lens in which a meniscus lens L314 having a surface that is convex toward image surface IMG side and a bi-concave lens L315 are bonded to each other. The third sub-group Rc having a positive refractive power includes a cemented lens in which a meniscus lens L316 having a surface that is convex toward the object OBJ side and a bi-convex lens L317 are bonded to each other, and a meniscus lens L318 having a surface that is convex toward the object OBJ side.

During zooming from the wide angle position to the telephoto position, an interval between the first lens group G1 having a positive refractive power and the second lens group G2 having a negative refractive power is increased, an interval between the second lens group G2 having a negative refractive power and the third lens group G3 having a positive refractive power is decreased, and an interval between the positive third lens group G3 and the positive rear lens group R is decreased.

Focusing in the nearest position is performed by moving the second sub-group Rb toward image surface IMG.

Table 13 shows the movement of the second sub-group Rb during zooming when an object distance is 0.3 m.

TABLE 13

| f = 16.5 | f = 30.0 | f = 48.5 |
|---|---|---|
| 0.404 | 1.047 | 3.589 |

FIGS. 16 to 21 are aberration diagrams of the zoom lens in the embodiment shown in FIG. 15.

From these aberration diagrams, it may be seen that the chromatic aberration is corrected from the wide angle position to the telephoto position in a balanced manner.

In addition, the zoom lens includes a wide angle region. The zoom lens also has an approximately triple to quintuple magnification ratio and secures a satisfactory optical performance and a sufficient point-blank range.

In addition, the focusing group is reduced in size by setting some groups having a negative refractive power in the rear lens group as focusing groups, and thus focusing within a close range may be rapidly performed.

The zoom lenses according to the embodiments and an imaging element, which receives an optical image formed by the zoom lens and converts the optical image into an electrical image signal, may be employed in various types of electronic devices.

Figure 22:
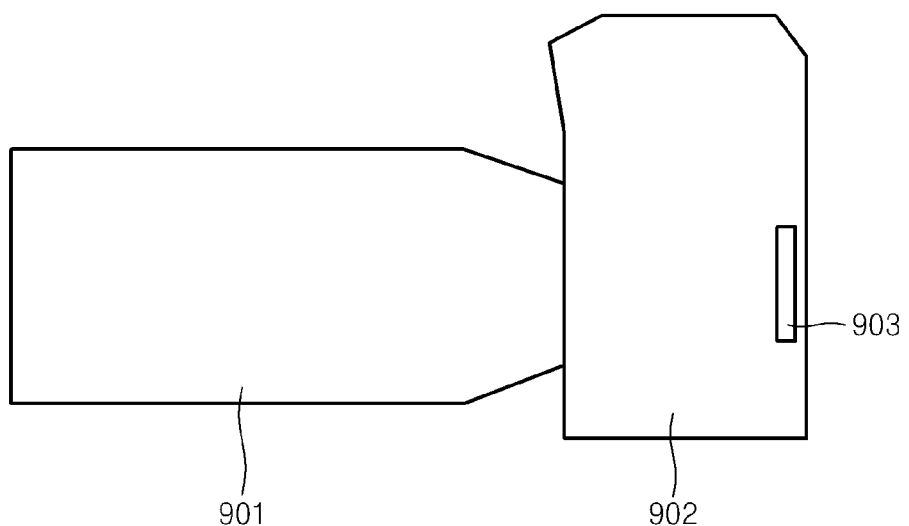
FIG. 22 is a schematic diagram showing a camera that employs an interchangeable lens as a zoom lens according to various embodiments of the present disclosure.

FIG. 22 is a schematic diagram showing a camera that employs an interchangeable lens 901 as a zoom lens according to the embodiments of the present disclosure.

Any of the zoom lenses according to the embodiments may be used as the interchangeable lens 901.

The interchangeable lens 901 is detachably installed on a main body portion 902.

A solid state imaging device 903, such as a charge-coupled device (CCD) or a complementary metal-oxide semiconductor (CMOS) imaging device, is disposed within the main body portion 902 so as to capture an image formed through the interchangeable lens 901. In addition, a silver salt film may be used instead of the solid state imaging device 903.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
    a first lens group having a positive refractive power;
    a second lens group having a negative refractive power;
    a third lens group having a positive refractive power; and
    a rear lens group having a positive refractive power,
    wherein the first lens group, the second lens group, the third lens group, and the rear lens group are sequentially disposed from an object side,
    wherein during zooming from a wide angle position to a telephoto position, an interval between the first lens group and the second lens group is increased, and an interval between the second lens group and the third lens group is decreased,
    wherein the rear lens group comprises, sequentially from the object side, a first sub-group having a positive refractive power, a second sub-group having a negative refractive power, and a third sub-group having a positive refractive power, and focusing in the nearest position is performed by moving the second sub-group toward an image surface side,
    wherein the first sub-group comprises
        at least one aspheric surface in which positive refractive power is decreased toward a peripheral portion thereof, and
        a cemented lens in which a negative lens and a positive lens are bonded to each other, and
    wherein the zoom lens satisfies the following conditions:

$0.2 < frt/ft < 1.8,$ $0.2 < |fb|/frt < 1.0,$ and $0.2 < fa/frt < 0.9,$ wherein "frt" denotes a focal length of the rear lens group at the telephoto position, "fa" denotes a focal length of the first sub-group, "fb" denotes a focal length of the second sub-group, and "ft" denotes a focal length of the zoom lens at the telephoto position.

2. The zoom lens of claim 1, wherein the third sub-group satisfies the following condition:

$$0.5 < fc/frt < 3.0,$$

wherein "fc" denotes a focal length of the third sub-group.

3. The zoom lens of claim 1, wherein during zooming from the wide angle position to the telephoto position, an interval between the rear lens group and a lens group disposed at the object side of the rear lens group is decreased.

4. An electronic device comprising:
the zoom lens of claim 1; and
an imaging device that receives an optical image formed by the zoom lens and converts the optical image into an electrical image signal.

5. An electronic device comprising:
an interchangeable lens employing the zoom lens of claim 1;
a main body portion to which the interchangeable lens is detachably installed; and
an imaging device that is disposed in the main body portion, receives an optical image formed by the zoom lens, and converts the optical image into an electrical image signal.

6. A zoom lens comprising:
a first lens group having a positive refractive power;
a second lens group having a negative refractive power;
a third lens group having a positive refractive power; and
a rear lens group having a positive refractive power,
wherein the first lens group, the second lens group, the third lens group, and the rear lens group are sequentially disposed from an object side,
wherein during zooming from a wide angle position to a telephoto position, an interval between the first lens group and the second lens group is increased, an interval between the second lens group and the third lens group is decreased, and an interval between the third lens group and the rear lens group is decreased,
wherein the rear lens group comprises, sequentially from the object side, a first sub-group having a positive refractive power, a second sub-group having a negative refractive power, and a third sub-group having a positive refractive power, and focusing in the nearest position is performed by moving the second sub-group toward an image surface side,
wherein the first sub-group comprises
at least one aspheric surface in which positive refractive power is decreased toward a peripheral portion thereof, and
a cemented lens in which a negative lens and a positive lens are bonded to each other, and
wherein the zoom lens satisfies the following conditions:

$$0.2 < frt/ft < 1.8,$$

$$0.2 < |fb|/frt < 1.0, \text{ and}$$

$$0.2 < fa/frt < 0.9,$$

wherein "frt" denotes a focal length of the rear lens group at the telephoto position, "fa" denotes a focal length of the first sub-group, "fb" denotes a focal length of the second sub-group, and "ft" denotes a focal length of the zoom lens at the telephoto position.

7. The zoom lens of claim 6, wherein the zoom lens satisfies the following conditions:

$$0.3 < f1/ft < 2.5,$$

$$0.05 < |f2|/ft < 0.5, \text{ and}$$

$$0.1 < f3/ft < 1.0,$$

wherein "f1", "f2", and "f3" respectively denote focal lengths of the first lens group, the second lens group, and the third lens group.

8. The zoom lens of claim 6, wherein the third sub-group satisfies the following condition:

$$0.5 < fc/frt < 3.0,$$

wherein "fc" denotes a focal length of the third sub-group.

9. An electronic device comprising:
the zoom lens of claim 6; and
an imaging device that receives an optical image formed by the zoom lens and converts the optical image into an electrical image signal.

10. An electronic device comprising:
an interchangeable lens employing the zoom lens of claim 6;
a main body portion to which the interchangeable lens is detachably installed; and
an imaging device that is disposed in the main body portion, receives an optical image formed by the zoom lens, and converts the optical image into an electrical image signal.

11. A zoom lens comprising, sequentially from an object side:
a first lens group having a positive refractive power;
a second lens group having a negative refractive power;
a third lens group having a positive refractive power;
a fourth lens group having a negative refractive power; and
a rear lens group having a positive refractive power,
wherein during zooming from a wide angle position to a telephoto position, an interval between the first lens group and the second lens group is increased, an interval between the second lens group and the third lens group is decreased, an interval between the third lens group and the fourth lens group is increased, and an interval between the fourth lens group and the rear lens group is decreased,
wherein the rear lens group comprises, sequentially from the object side, a first sub-group having a positive refractive power, a second sub-group having a negative refractive power, and a third sub-group having a positive refractive power, and focusing in the nearest position is performed by moving the second sub-group toward an image surface side,
wherein the first sub-group comprises
at least one aspheric surface in which positive refractive power is decreased toward a peripheral portion thereof, and
a cemented lens in which a negative lens and a positive lens are bonded to each other, and
wherein the zoom lens satisfies the following conditions:

$$0.2 < frt/ft < 1.8,$$

$$0.2 < |fb|/frt < 1.0,$$

$$0.2 < fa/frt < 0.9, \text{ and}$$

wherein "frt" denotes a focal length of the rear lens group at the telephoto position, "fa" denotes a focal length of the first sub-group, "fb" denotes a focal length of the second sub-group, and "ft" denotes a focal length of the zoom lens at the telephoto position.

12. The zoom lens of claim 11, wherein the zoom lens satisfies the following conditions:

$0.3 < f1/ft < 2.5,$ $0.05 < |f2|/ft < 0.5,$ $0.1 < f3/ft < 1.0,$ $0.2 < |f4|/ft < 2.5,$ and wherein "f1", "f2", "f3", and "f4" respectively denote focal lengths of the first lens group, the second lens group, the third lens group, and the fourth lens group.

13. The zoom lens of claim 11, wherein the third sub-group satisfies the following condition:

$0.5 < fc/frt < 3.0,$ wherein "fc" denotes a focal length of the third sub-group.

14. An electronic device comprising:
the zoom lens of claim 11; and
an imaging device that receives an optical image formed by the zoom lens and converts the optical image into an electrical image signal.

15. An electronic device comprising:
an interchangeable lens employing the zoom lens of claim 11;
a main body portion to which the interchangeable lens is detachably installed; and
an imaging device that is disposed in the main body portion, receives an optical image formed by the zoom lens, and converts the optical image into an electrical image signal.

* * * * *